(12) United States Patent
Suppa et al.

(10) Patent No.: US 12,195,140 B2
(45) Date of Patent: Jan. 14, 2025

(54) SONAR DEVICE AND SONAR SYSTEM

(71) Applicant: THALES, Courbevoie (FR)

(72) Inventors: Vito Suppa, Sophia Antipolis (FR); Michel Ricard, Sophia Antipolis (FR)

(73) Assignee: THALES, Courbevoie (FR)

( * ) Notice: Subject to any disclaimer, the term of this patent is extended or adjusted under 35 U.S.C. 154(b) by 449 days.

(21) Appl. No.: 17/614,994

(22) PCT Filed: Apr. 29, 2020

(86) PCT No.: PCT/EP2020/061830
§ 371 (c)(1),
(2) Date: Nov. 29, 2021

(87) PCT Pub. No.: WO2020/239345
PCT Pub. Date: Dec. 3, 2020

(65) Prior Publication Data
US 2022/0234692 A1    Jul. 28, 2022

(30) Foreign Application Priority Data

May 29, 2019  (FR) ...................................... 1905728

(51) Int. Cl.
*B63B 21/06* (2006.01)
*B63B 21/16* (2006.01)
(Continued)

(52) U.S. Cl.
CPC .............. *B63B 21/66* (2013.01); *B63B 21/16* (2013.01); *B63B 79/10* (2020.01); *G01V 1/201* (2013.01);
(Continued)

(58) Field of Classification Search
CPC ......... B63B 21/66; B63B 21/16; B63B 79/10; B63B 2201/18; G01V 1/3843; G01V 1/201

See application file for complete search history.

(56) References Cited

U.S. PATENT DOCUMENTS 3,966,171 A    6/1976  Hale
9,001,623 B1   4/2015  Sharp et al.
(Continued)

FOREIGN PATENT DOCUMENTS

CA    2 997 197 A1    4/2017
EP    2 232 294 A1    9/2010
(Continued)

*Primary Examiner* — Stephen P Avila
(74) *Attorney, Agent, or Firm* — BakerHostetler

(57) ABSTRACT

A sonar device including a tow cable and a towed body elongate along a longitudinal axis from a first longitudinal end to a second longitudinal end. The towed body includes a plurality of electroacoustic transducers aligned along the longitudinal axis and is connected to the tow cable, so it is able, when it is towed and fully submerged, to be oriented along a vertical axis. At least one towed body is connected to the tow cable by a first hanger and a second hanger. First ends of the first and second hangers are connected to the tow cable and a second end of the first hanger is attached to the towed body at a first fixing point near the first longitudinal end and a second end of the second hanger is attached to the towed body at a second fixing point near the second longitudinal end.

15 Claims, 10 Drawing Sheets

(51) Int. Cl.
  *B63B 21/66*  (2006.01)
  *B63B 79/10*  (2020.01)
  *G01V 1/20*  (2006.01)
  *G01V 1/38*  (2006.01)

(52) U.S. Cl.
  CPC ........ *G01V 1/3843* (2013.01); *B63B 2201/18* (2013.01)

(56)  References Cited

U.S. PATENT DOCUMENTS

2013/0025521 A1\* 1/2013 Soreau .................... B63B 23/32
                                                          114/259
2013/0121114 A1  5/2013 Vahida

FOREIGN PATENT DOCUMENTS

| FR | 2 964 201 A1 | 3/2012 |
| GB | 2 564 523 A | 1/2019 |
| WO | 2017/035660 A1 | 3/2017 |
| WO | 2017/054795 A1 | 4/2017 |

\* cited by examiner

SONAR DEVICE AND SONAR SYSTEM

CROSS-REFERENCE TO RELATED APPLICATIONS

This application is a National Stage of International patent application PCT/EP2020/061830, filed on Apr. 29, 2020, which claims priority to foreign French patent application No. FR 1905728, filed on May 29, 2019, the disclosures of which are incorporated by reference in their entirety.

The invention relates to the field of the handling of sonar devices of the type comprising a so-called active part intended to be immersed and towed by a surface ship via a heavy tow cable. The active part comprises a linear acoustic wave emitting antenna which is elongate along a longitudinal axis of the antenna. This longitudinal axis is intended to extend substantially vertically in operation, when the antenna is fully immersed, so as to emit acoustic waves mainly in a horizontal plane. The sonar system may comprise a linear receiving antenna able to detect echoes of the acoustic waves emitted by the emitting antenna. The linear receiving antenna is intended to be towed by the tow cable via the linear emitting antenna.

BACKGROUND

Sonar devices in which the tow cable is fixed to a central part situated near the middle of the linear emitting antenna along the longitudinal axis thereof are known. In order to recover the, initially immersed, emitting antenna on board a surface ship, it is known practice to employ equipment of the arm type which allows the linear emitting antenna to be caught as soon as it exits the water, lifted and moved over the deck of the surface ship, through a pivoting and potentially translational movement of the arm. During this maneuver, the emitting antenna always remains vertical. It is intended that an operation of unhooking the emitting antenna from the tow cable be performed before the tow cable and the linear receiving antenna are wound onto the one same winch. The linear emitting antenna is stored on board the surface ship next to the winch.

Now, a linear emitting antenna generally has a length of several meters, which means that large openings have to be designed into the stern of the carrying ship in order to allow this antenna to be recovered. Furthermore, it is often the case that a "recess" has to be created in the main deck in order to store the emitting antenna which is too long to be housed between the main deck and the deck above.

Other types of sonar systems with large linear emitting antenna and in which the emitting antenna is connected to the cable in such a way that the antenna extends vertically when being towed by a cable are known. The emitting antenna is able to pivot with respect to the cable about a horizontal axis perpendicular to the axis of traction of the towed emitting antenna so as to extend longitudinally roughly parallel to the axis of the cable in a so-called capture orientation. These systems comprise recovery means that allow the emitting antenna to be brought back on board the carrying ship only by winding the cable, the cable pulling the emitting antenna toward the ship along the axis of the cable. The antenna adopts the capture orientation as it exits the water during the recovery step, either naturally or under the action of an actuator. As a result, when the antenna passes through the opening made in the ship, its limited bulk in a plane transverse to the axis of the ship means that the size of this opening may be limited.

However, recovering the antenna in this capture configuration is not favorable to storing it in a limited volume. Moreover, this solution is suitable only for sonar devices comprising a linear antenna to the rear of the emitting antenna. The absence of traction applied by a receiving antenna means that a bulky recovery mechanism, for example of the pivoting arm or crane type, has to be employed.

One example of a system of this type is disclosed in document U.S. Pat. No. 9,001,623. After recovery, the antenna is stored, onboard the surface ship, in an elongate position running lengthwise along the longitudinal axis of the surface ship, which entails a surface ship of long length capable of offering a place at the stern having a long length of volume available. Moreover, means are provided for disconnecting the cable from the emitting antenna so that the receiving antenna can be stored on the same winch as the tow cable. Document WO 2017/035660 A1 also discloses this type of sonar system. It proposes a solution that avoids disconnection and reduces the volume of the sonar device by storing the linear emitting antenna on the drum of the winch with its longitudinal axis substantially perpendicular to the axis of rotation of the winch. However, this orientation is not very stable and mechanical means, that have to be fitted by an operator, need to be provided in order to fix the antenna to the drum of the winch.

Furthermore, when recovering antennas in an elongate position, these have an orientation that is not very stable and is uncontrollable, therefore increasing the risk of collisions with the hull of the surface ship, particularly when the sea is rough. These solutions therefore require protection in order to protect the antenna from collisions. Document U.S. Pat. No. 9,001,623 provides a towed nest surrounding the antenna and into which the antenna is brought while elongate. This nest protects the antenna from potential collisions, but makes the solution very complex.

Another solution disclosed in patent application EP 2 232 294 A1 filed by the applicant company consists in providing a flexible emitting linear antenna configured and fixed to the towing cable and to the receiving antenna in such a way as to extend linearly substantially vertically during towing and so as to curve in order to be wound onto a drum of a winch like the towing cable and the receiving antenna. However, operational implementation of this solution involves adjustments and is confined to a lightweight antenna that is difficult to achieve with a high level of performance, the heavy electroacoustic transducers being able to emit with a good sound level.

Patent application WO2017/054795 A1 discloses a sonar device comprising a flexible emitting antenna and so-called tensioning means, such as a floating anchor for example, allowing the emitting antenna, when towed, to adopt a linear configuration in which it is vertical. This solution presents disadvantages similar to those of the solution disclosed in patent application EP 2 232 294 A.

SUMMARY OF THE INVENTION

It is an object of the invention to limit at least some of the aforementioned disadvantages.

To this end, one subject of the invention is a sonar device intended to be towed by a surface ship and comprising a tow cable and a set of at least one towed device, comprising a towed body, intended to be towed by the surface ship via the tow cable, the towed body being elongate along a longitudinal axis from a first longitudinal end of the towed body as far as a second longitudinal end of the towed body, the towed body incorporating a first linear acoustic antenna comprising a plurality of electroacoustic transducers substantially aligned along the longitudinal axis, the towed device, which could be the towed body, being balanced, or configured and connected to the tow cable in such a way that the towed body is able, when it is being towed and is fully submerged, to exhibit an orientation in which the longitudinal axis extends substantially along a vertical axis defined by the force of gravity, at least one towed body of the set of towed bodies being connected to the tow cable by a first hanger and a second hanger of substantially the same length, a first end of the first hanger and a first end of the second hanger being connected to the cable and a second end of the first hanger being attached to the towed body at a fixing point of the towed body, which point is situated near the first longitudinal end, and a second end of the second hanger being attached to the towed body at a second fixing point secured to the first fixing point and situated near the second longitudinal end.

In one particular embodiment, the towed device is the towed body.

Advantageously, the first hanger and the second hanger each have a fixed length.

Advantageously, the second end of the first hanger is attached to the first longitudinal end of the towed body and the second end of the second hanger is attached to the second longitudinal end of the towed body.

In one embodiment, the sonar device comprises a flexible elongate body of substantially neutral buoyancy intended to be towed by the tow cable and comprising a second acoustic antenna comprising a plurality of electroacoustic transducers distributed along the flexible elongate body, the flexible elongate body is connected to the tow cable via the set of at least one towed body, the towed body being connected to the flexible elongate body in such a way that the flexible elongate body applies traction to the towed body at a third fixing point situated near the first longitudinal end of the towed body and a fourth fixing point situated near the second longitudinal end of the towed body.

For example, at least one towed body of the set of at least one towed body is connected to the flexible elongate towed body by a third hanger and a fourth hanger, a first end of the third hanger being attached to the towed body at a third fixing point situated near the first longitudinal end of the towed body and a first end of the fourth hanger being attached to the towed body at a fourth fixing point situated near the second longitudinal end of the towed body. This towed body is the same towed body as or a different towed body than the one that is connected to the first and to the second hanger.

The set of at least one towed body comprises a single towed body or a plurality of towed bodies.

In one particular embodiment, the set of at least one towed body comprises a plurality of towed bodies, the sonar device comprising at least one line joining together two bodies of the towed set and comprising at least one electroacoustic transducer.

The invention also relates to a sonar system comprising the sonar device and a handling device intended for launching and recovering the sonar device from the surface ship, the handling device comprising a winch comprising a first drum able to rotate about a first axis of rotation to wind the tow cable onto the first drum.

Advantageously, the handling device comprises a set of at least one convex deflector having the overall shape of a portion of a cylinder extending longitudinally along an axis of the deflector, the deflector being arranged in such a way as to extend substantially horizontally, in a calm sea state, and substantially perpendicular to a vertical plane substantially parallel to an axis of the traction applied to the tow cable by the handling device during a first step of winding during which the first drum is rotationally driven about the first axis so that the tow cable is wound onto the first drum and so that the first hanger and the second hanger come to bear against the deflector so as to be deflected by the deflector so that the longitudinal axis of the towed body is oriented substantially parallel to the axis of the deflector when the towed body is fully emerged and suspended from the first hanger and from the second hanger.

Advantageously, the axis of at least one deflector of the set is substantially parallel to the first axis of rotation.

Advantageously, at least one deflector of the set of at least one deflector is arranged in such a way that, during the first winding step, the first hanger and the second hanger are able to come to bear against the deflector, when the towed body is fully immersed.

Advantageously, the set comprises at least one deflector arranged upstream of the first drum, viewed from the first hanger and from the second hanger initially immersed, during the first winding step.

The invention also relates to a sonar system wherein the winch comprises a set of at least a second drum surrounding the first drum and able to rotate with respect to a frame of the winch about a second axis of rotation substantially parallel to the first axis of rotation, the winch being able to be in an uncoupled state in which the first drum and the second drum are uncoupled in terms of rotation about the first axis of rotation and about the second axis of rotation, so as to allow the tow cable to be wound onto the first drum during the first winding step during which the first drum is rotationally driven about the first axis, the second drum being able to be in an open state in which the second drum exhibits a receiving opening through which the towed body is able to pass in order to enter a volume surrounding the first drum and which is surrounded by the second drum, the winch being able to be in a coupled state in which the first drum and the second drum are coupled in terms of rotation about the second axis of rotation so as to allow the flexible elongate body to be wound about the second axis of rotation during a second winding step during which the second drum is rotationally driven about the second axis. The towed body may be capable of passing through the receiving opening during the first winding step or outside of this step.

Advantageously, the second drum is able to be in a receiving angular position, about the second axis with respect to the frame, in which position the tow cable and the towed body pass through the receiving opening during the first winding step.

Advantageously, the handling device is configured to implement the following step during a method of recovering the initially immersed sonar device and connected to the drum via the tow cable: the first winding step during which the first drum is rotationally driven about the first axis so that the tow cable is wound onto the first drum and so that the first hanger and the second hanger come to bear against the deflector to be deflected by the deflector so that the longitudinal axis of the towed body is oriented substantially parallel to the axis of the deflector, when the towed body is fully emerged and suspended from the first hanger and from the second hanger.

The invention also relates to the recovery method which comprises this step.

Advantageously, the handling device is configured to implement the first winding step until the towed body enters the volume delimited by the second drum through the receiving opening, and then a second winding step during which the second drum of the handling device, which is in the second state, is rotationally driven about the second axis of rotation so as to wind the flexible linear body onto the second drum.

BRIEF DESCRIPTION OF THE DRAWINGS

Further features and advantages of the invention will become apparent from reading the detailed description which follows, which is given by way of nonlimiting example and with reference to the attached drawings in which.

From one figure to another, the same elements are identified by the same references.

DETAILED DESCRIPTION

Figure 1:
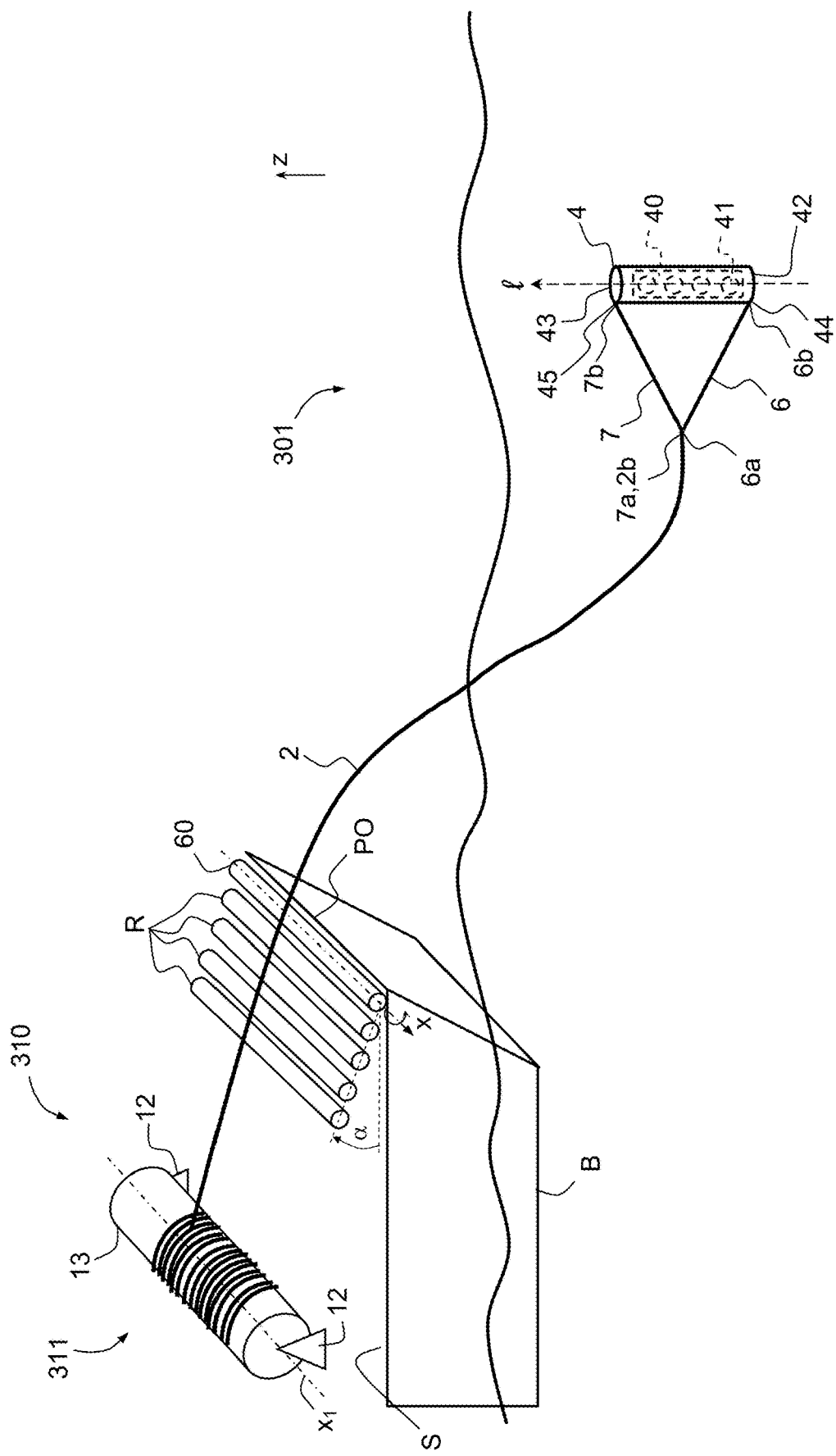
FIG. 1 schematically depicts an underwater system according to the invention comprising a handling device according to a first embodiment and an underwater device according to a first embodiment in a state of being towed, FIG. 2 schematically depicts the underwater system of FIG. 1 when the towed body comes out of the water, FIG. 3 schematically depicts the underwater system of FIG. 1 when the towed body approaches the surface ship and is suspended from the first hanger and from the second hanger, FIG. 4 schematically depicts the underwater system of FIG. 1 when the towed body is recovered onboard the surface ship, FIG. 5 schematically depicts a sonar system comprising a handling device, according to a second embodiment, during a phase of towing an underwater device, according to a second embodiment, FIG. 6 schematically depicts the sonar system of FIG. 5 during a phase of recovering the towed body, FIG. 7 schematically depicts the sonar system of FIG. 5 during a phase of storage of the towed body, FIG. 8 schematically depicts a sonar system comprising a handling device, according to a third embodiment, during a phase of recovering the sonar device of FIG. 5, FIG. 9 schematically depicts various phases of a method for recovering the sonar device of FIG. 5 using the handling device of FIG. 8, FIG. 10 schematically depicts an example of towed body of a different shape than that of FIGS. 1 to 7, FIG. 11 schematically depicts an underwater device comprising a plurality of towed bodies, FIG. 12 schematically depicts an underwater device comprising a plurality of towed bodies connected to one another in a different way than that of FIG. 12.

The invention relates to a sonar device 301 of which a first embodiment is depicted in FIG. 1. The sonar device 301 according to the invention is intended to be towed by a surface ship B. The invention also relates to a sonar system comprising the sonar device 301 according to the invention and a handling device 310 for launching and recovering the sonar device 301 according to the invention from the surface ship B. The invention additionally relates to a surface ship B comprising the sonar system according to the invention in which the sonar device 301 is connected to the handling device 310 installed onboard the surface ship.

The sonar device 301 according to the invention comprises an active part intended to operate in a fully immersed state when the sonar device is being towed.

The active part comprises a linear acoustic wave emitting antenna 40, or more generally, a linear emitting acoustic antenna which is elongate along the longitudinal axis l comprising a plurality of electroacoustic transducers 41 substantially aligned along the longitudinal axis l.

The longitudinal axis l of the linear emitting antenna 40 is intended to extend substantially along a vertical axis z during operation when the sonar device 301 is immersed and being towed by the carrier ship, with the linear acoustic antenna 40 fully immersed. In that way, the linear emitting antenna 40 emits acoustic waves mainly in a horizontal plane. The vertical axis z is defined by the force of gravity. This is an axis substantially perpendicular to the surface of the sea in a calm sea state which then defines a horizontal plane.

The linear emitting antenna 40 is integrated into a towed body 4 along the longitudinal axis l. The towed body 4 extends, along the longitudinal axis, from a first longitudinal end 42 of the towed body 4 as far as a second longitudinal end 43 of the towed body 4.

The first longitudinal end 42 is advantageously securely attached to the second longitudinal end 43.

Thus, the linear emitting antenna 40 integrated into the body 4 deforms neither during towing by the surface ship when fully immersed, nor while the antenna is being recovered onboard the surface ship, nor while it is being stored onboard the surface ship. This configuration means that the characteristics of the emission pattern of the antenna are precisely known. This configuration improves the technical ease of production of the sonar device by guaranteeing that the electroacoustic transducers are aligned. Tricky steps of adjusting the sonar device to ensure this geometry during towing are not required.

A towed device, which in the nonlimiting example of the figures is the towed body 4, is configured and connected to the tow cable 2 and to the body 3 in such a way that the towed body 4 is able to adopt a substantially vertical orientation (l substantially parallel to z) when it (the towed body) is being towed, fully immersed, via the cable 2.

To make it easier to obtain a vertical orientation of the linear emitting antenna 40 during operation, the towed device, for example the towed body 4 in the example of the figures, is balanced in such a way as to exhibit, in hydrostatic equilibrium, namely when subjected only to the force of gravity and to Archimedean upthrust, a hydrostatic-equilibrium orientation in which the longitudinal axis l is substantially vertical (parallel to the axis z) and in which the first longitudinal end 42 of the towed body 4 is at a greater depth than its second longitudinal end 43. In other words, in this hydrostatic-equilibrium orientation, the first longitudinal end 42 is further from the mean sea surface level than the second longitudinal end 43.

To this end, the towed body 4 comprises, for example, a ballast weight of density greater than the density of the water near the first longitudinal end 42 and a float exhibiting positive buoyancy near the second longitudinal end 43.

As a variant, the towed body comprises a ballast weight of density greater than the density of the water near the first longitudinal end 42 or a float exhibiting positive buoyancy near the second longitudinal end 43.

The towed body 4 may exhibit substantially neutral buoyancy, but this is not indispensable. As a variant, the body exhibits negative buoyancy, thereby allowing it to reach greater depths.

In the embodiment of the figures, the towed device is the towed body.

In a variant, the towed device comprises the towed body and a set of at least one ballast weight and/or a set of at least one float. The towed body being configured and the set of at least one ballast weight and/or the set of at least one float being configured and connected to the towed body in such a way that the towed body exhibits the required orientation (l substantially vertical) in hydrostatic equilibrium.

The sonar device 301 comprises a tow cable 2 intended to be connected to the surface ship B and, more particularly, to the handling device 310. The tow cable 2 is connected to the towed body 4 which is intended to be towed by the surface ship B via the tow cable 2. The tow cable may be a bare cable, a jacketed cable, or a faired cable.

The tow cable 2 advantageously exhibits negative buoyancy. It is then said to be a heavy cable. The weight of the cable therefore allows the towed body to be positioned at depth.

Figure 5:
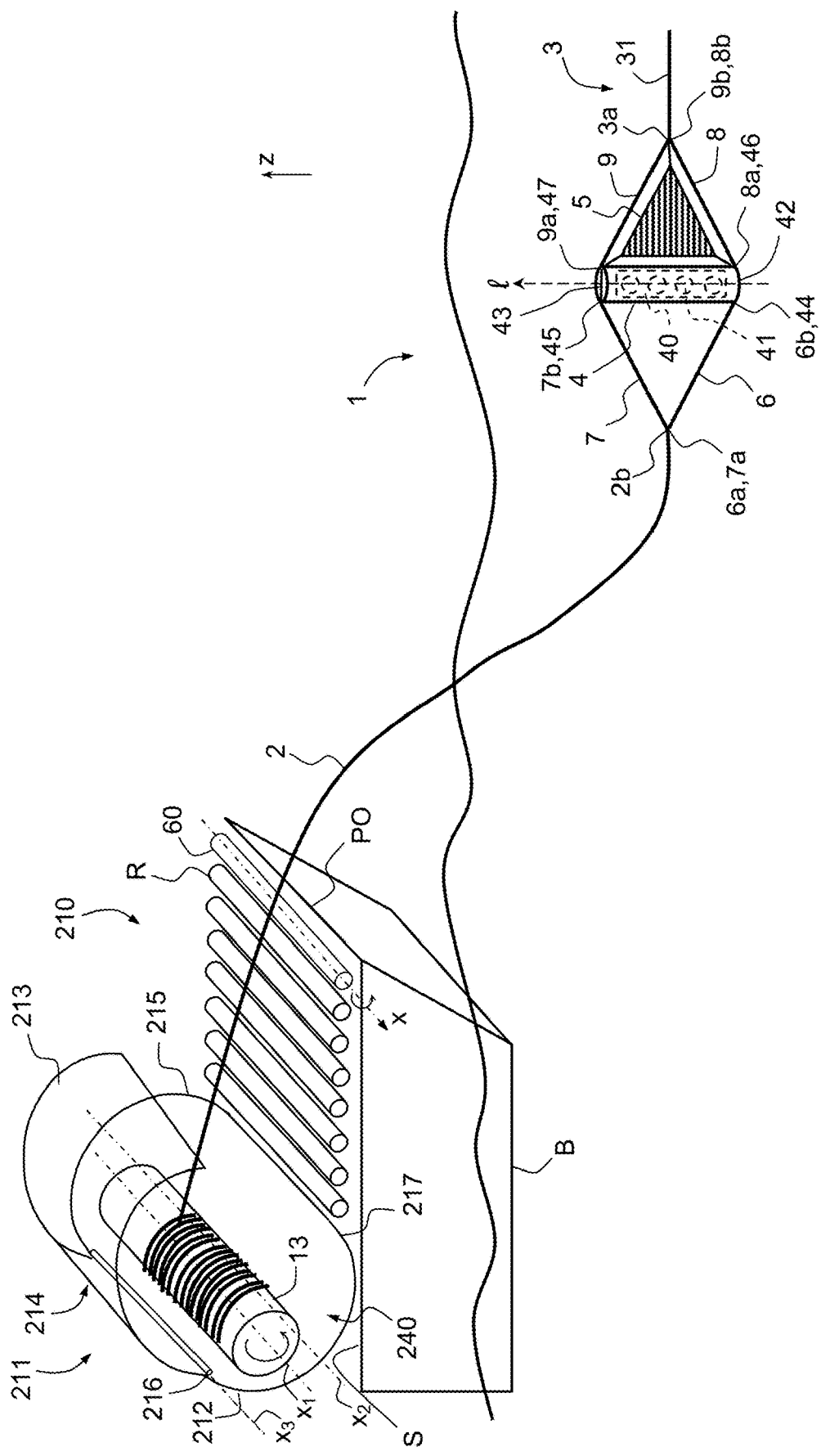

The underwater device 301 further comprises an attachment device comprising, as visible in FIG. 5, a first hanger 6 and a second hanger 7 of substantially the same length, each connecting the tow cable 2 to the towed body 4. In other words, the length of the two hangers differs from the length of one of the hangers by 5% at most.

If the lengths between the hangers differ slightly, while remaining within the 5% tolerance, the first hanger 6 has a length less than or equal to the length of the second hanger 7 in order to achieve proper control over the orientation of the towed body, but the hangers preferably have the same length in order to permit better control over the orientation of the towed body.

The hangers are flexible elongate bodies. These are, for example, cables or ropes, belts or chains. Each hanger may be a portion of a flexible element longer than the hanger, extending beyond the first end and/or beyond the second end of the hanger, or else may be a flexible element of the same length as the hanger.

The hangers 6 and 7 each have a fixed or invariable length. In other words, the hangers do not lengthen during the operations of launching, recovering, storing and towing the sonar device 301. This embodiment offers the advantage of being simple, economical and robust. It requires no mechanism for varying the lengths of the hangers.

As a variant, at least one of the two hangers 6 and 7 has a length that is variable. For example, the hangers 6 and 7 have a variable length. The length of one or of a plurality of hangers can thus be varied during the recovery or the launch of the towed body.

In a variant, the towed device comprises the hangers 6 and 7 and one of the hangers comprises a ballast weight and the other hanger comprises a float so that the towed body exhibits a vertical orientation when the towed body 4 is being towed by the tow cable 2.

The tow cable 2 comprises a first end, which is intended to be connected to the surface ship B and more particularly to the handling device 310, and a second end 2b connected to a first end 6a of the first hanger 6. A second end 6b of the first hanger 6 is attached to the towed body at a first fixing point 44 of the towed body 4 situated near the first longitudinal end 42. The second hanger 7 comprises a first end 7a connected to the second end 2b of the tow cable 2 and a second end 7b attached to the towed body 4 at a second fixing point 45 of the towed body 4 situated near the second longitudinal end 43. The two fixing points 44 and 45 are distant from one another along the longitudinal axis l. The second fixing point 45 is securely attached to the first fixing point 44.

What is meant by a fixing point is the point at which the hanger applies a force of traction to the towed body 4. The traction force applied by the tow cable 2 to the hanger is transferred to the fixing point by the hanger.

In the figures, the ends 6a and 7a are fixed with respect to the end 2b of the tow cable 2.

The two hangers may be attached to the tow cable.

Advantageously, each of the two hangers has a stiffness lower than that of the tow cable 2.

As a variant, one of the two hangers is a portion of the tow cable. In other words, the diameter of the continuous cable is substantially the same along the entire length of the continuous cable.

Advantageously, the stiffness of the continuous cable is substantially fixed along the continuous cable. In other words, the stiffness has substantially the same value along the entire length of the continuous cable.

The hangers 6 and 7 are arranged in such a way as to form a V shape when taut. The V comprises a pointed end to which the second end 2b of the cable is fixed.

The hangers 6, 7 may be fixed permanently or removably to the towed body 4.

The towed body 4 may be connected to the tow cable by just two hangers, these being the first hanger 6 and the second hanger 7. In a variant, the sonar device has a set of at least one intermediate hanger connecting the tow cable to the towed body by being fixed to the towed body at a fixing point positioned between the first fixing point 44 and the second fixing point 45.

The sonar device according to the invention offers, on account of its special attachment device, the advantage of allowing simple and relatively safe recovery and launch of the towed body 4 from a surface ship B while keeping the geometry of the linear emitting antenna 40 fixed, ensuring easy adjustment of the device. The use of a pivoting arm or of a crane is not indispensable.

The sonar device 301, initially immersed such that the towed body 4 is fully immersed, can be recovered and launched simply from the surface ship B, using a lightweight and simple handling device 310 comprising:
  a winch 311 comprising a first drum 13 intended to rotate about a first axis of rotation x1 with respect to a frame 12 of the winch which is fixed to a structure S of the surface ship B, so as to wind the tow cable 2 onto the first drum 13,
  a deflector 60, being a convex friction surface exhibiting roughly the shape of a portion of a cylinder (not necessarily one with a circular cross section) extending longitudinally along an axis x of the deflector, the deflector 60 being positioned in such a way as to extend substantially horizontally, in a calm sea state, and substantially perpendicular to a vertical plane substantially parallel to an axis of traction applied to the tow cable 2 by the handling device 310 during a first winding step during which the first drum 13 is rotationally driven about the first axis x1 with respect to the frame 12, so that the tow cable 2 is wound onto the first drum 13.

The deflector 60 is also positioned in such a way that the first hanger 6 and the second hanger 7 come to bear against the deflector 60 to be deflected by the deflector 60 during the first winding step so that the longitudinal axis l extends substantially parallel to the axis x of the deflector 60, when the towed body 4 is fully emerged and suspended from the hangers 6 and 7 as visible in FIGS. 2 and 3 and explained in greater detail hereinafter. The hangers 6 and 7 are therefore taut and linear between the deflector and the elongate body. In other words, when the towed body 4 is suspended from the hangers 6 and 7 deflected by the deflector 60, the longitudinal axis l is substantially parallel to the axis of the deflector x.

Specifically, as depicted in FIG. 1, when the sonar device is being towed by the surface ship B, with the towed body 4 fully immersed and towed by the tow cable 2, the two hangers 6 and 7 are substantially taut and the towed body 4 is substantially vertical (namely with its longitudinal axis substantially vertical) because of the hydrostatic forces and the forces of drag acting on the towed body when the shape of the elongate body is suitable, for example when the shape of the towed body 4 is substantially symmetrical with respect to a plane perpendicular to the longitudinal axis l and with respect to a plane containing the longitudinal axis l and intended to contain the tow cable during towing.

The tow cable 2 is able to bear against the deflector 60 in order to be deflected by the deflector 60 into the vertical plane containing the tow cable 2 during the towing of the sonar device with the elongate body fully immersed. This is true when the towing speed of the ship is below or equal to a certain threshold for a given installation of the handling device onboard the surface ship B.

As long as the towed body 4 is fully immersed (even stationary), the towed body 4 remains substantially vertical (longitudinal axis l substantially vertical) because of the hydrostatic forces when it is configured to be substantially vertical when subjected only to Archimedean upthrust and to the gravity, for example when it comprises a float near the second end 43 and a ballast weight near the first end 42.

During a first winding step, during which the first drum 13 is rotationally driven about the first axis x1, the tow cable 2 is wound onto the first drum 13.

The towed body 4 progressively rises up toward the surface. Because of the balance of the towed body 4, the second end 43 reaches the water surface before the first end 42. When the second end 43 is above the water surface, the Archimedean upthrust is no longer enough to keep the towed body 4 vertical, and so the second longitudinal end 43 of the towed body 4 has a tendency to topple, under the effect of its weight, which is to say move away from the vertical orientation and attempt to adopt a substantially horizontal orientation (the longitudinal axis l is substantially horizontal) as depicted in FIG. 2.

Figure 2:
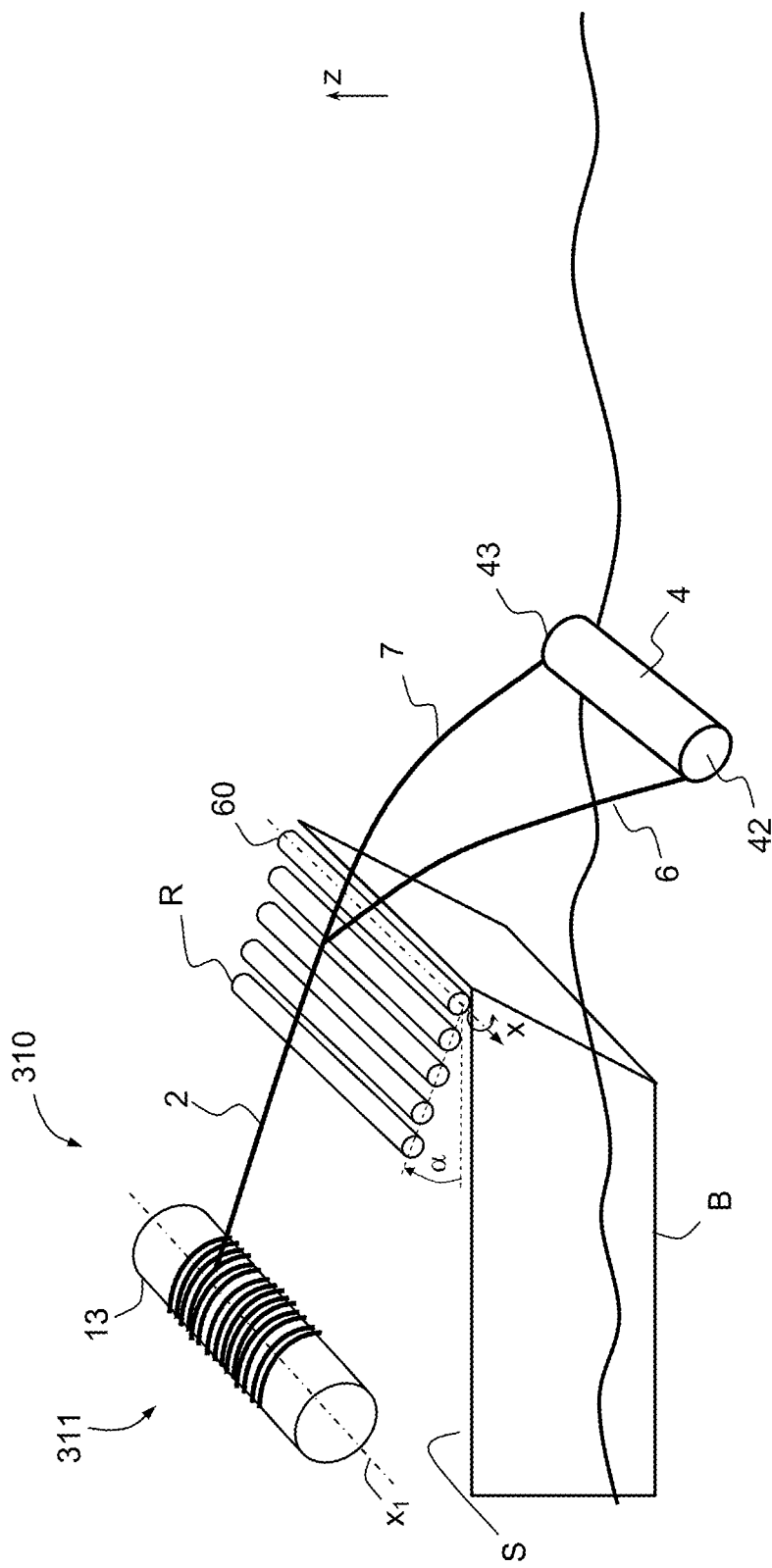

In the nonlimiting example of FIG. 2, the two hangers 6, 7 are long enough to bear against and be deflected by the deflector 60 as depicted in FIG. 2, while the towed body 4 is still immersed, while the towed device is being towed by the surface ship.

Advantageously, the two hangers 6, 7 are long enough to bear against and be deflected by the deflector 60 as depicted in FIG. 2 when the towed body 4 is still immersed, when the towed device is being towed by the surface ship when the speed is below or equal to a maximum towing speed during recovery of the sonar device, in a calm sea state. The maximum towing speed during recovery of the body is below 10 knots and preferably equal to 6 knots or more.

In that case, when the towed body 4 reaches the water surface, with the first hanger 6 bearing against the deflector 60 and deflected by the deflector 60, the towed body 4 topples under the effect of its weight, the second end 43 of the towed body 4 taking with it the second end 7b of the second hanger 7 which tends to remain taut. The towed body 4 thus progressively topples over during the first winding step, namely as the rotation of the first drum 13 about the axis x1 continues in the same sense of rotation so that the cable 2 applies to the hangers 6, 7 traction toward the first drum in a plane substantially perpendicular to the axis x, until such point as the second hanger 7 comes to bear against the deflector 60 to be deflected by the deflector 60 as depicted in FIG. 2.

When the two hangers 6 and 7 are bearing against and being deflected by the deflector 60, they are taut between the deflector 60 and the towed object 4. Because the two hangers 6 and 7 have the same length and the deflector 60 has a cross section that is substantially fixed along the axis x, those portions of the hangers 6 and 7 that are situated between the regions via which they respectively bear against the deflector 60 and the towed body 4 have the same length, and the towed body 4, in a calm sea state, adopts what is referred to as a handling orientation in which the longitudinal axis l is substantially parallel to the axis x of the deflector 60.

Figure 3:
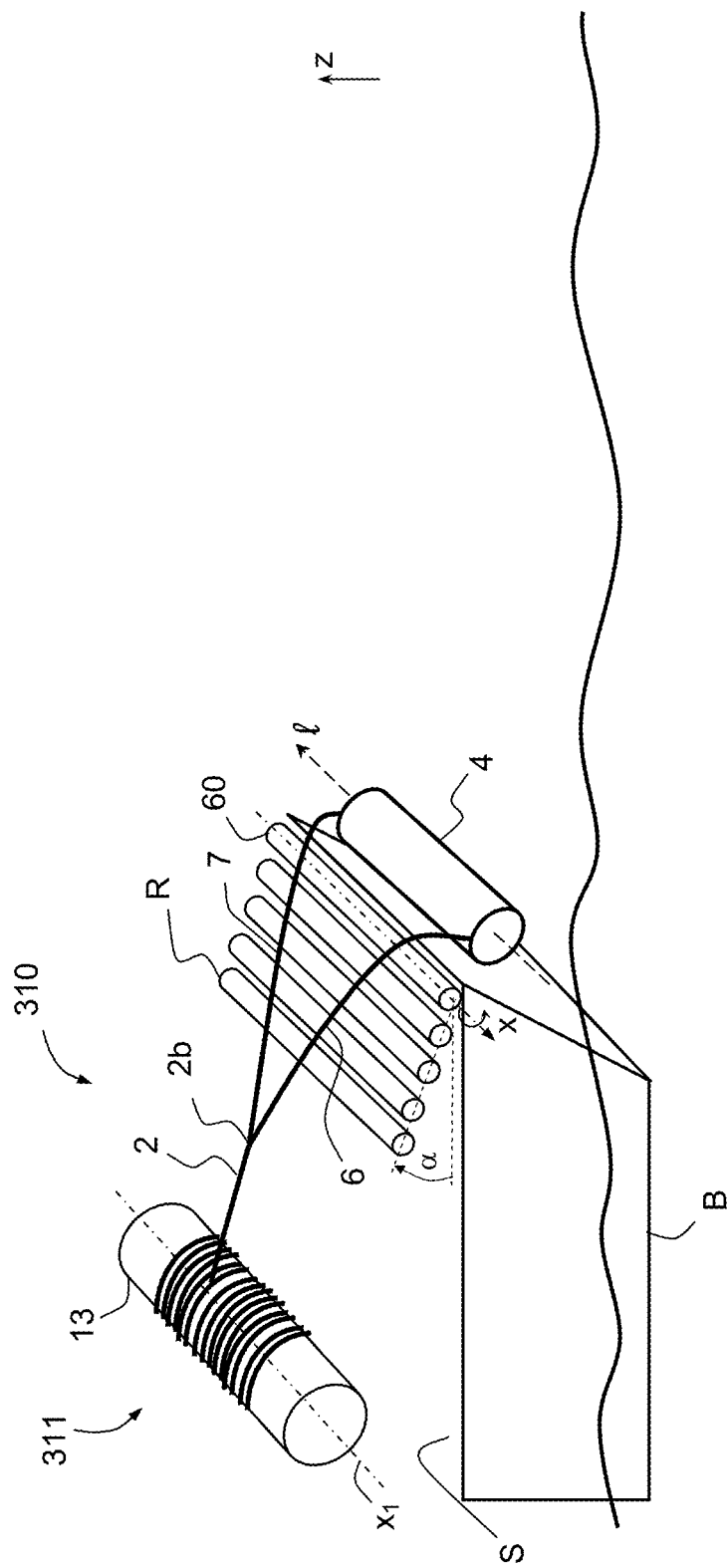

By continuing the rotation of the first drum 13 in the first sense of rotation, the fully emerged towed body 4 suspended from the hangers 6 and 7 exhibits, in a calm sea state, the handling attitude in which its longitudinal axis l is substantially parallel to the axis of the deflector as depicted in FIG. 3. When the sea state is rough, the orientation of the towed body 4 may vary, but the closer the towed body 4 comes to the deflector 60, namely the more the length of those portions of the hangers 6 and 7 that are situated between the regions via which they bear on the deflector 60 and the towed body 4 decreases, the more firmly it is held in the handling orientation. The freedom of movement of the towed body 4 is reduced, as visible in FIGS. 3 and 4, until it comes to bear against the deflector 60 and is recovered onboard the surface ship B as visible in FIG. 4.

Conversely, during a method of launching the sonar device, the towed body is kept substantially in the handling orientation by the two hangers bearing against the deflector until immersion is achieved.

The attachment device, using hangers 6, 7 for attachment of the sonar device 301 according to the invention, makes the launching and recovery of a towed body 4 from a surface ship B safer, thereby limiting the risk of collision between the towed body 4 and the stern of the surface ship B.

Owing to the simplicity and relative safety of the recovery and launch of the towed body 4 from a surface ship, this sonar device 301 is well suited to use onboard a USV.

Moreover, recovery of the towed body 4 in the handling orientation means that it is possible to provide an opening of reduced height in the stern of the surface ship, thereby avoiding the creation of recesses in the deck of the surface ship and limiting the size of the storage zone for storing this towed body along the longitudinal axis of the surface ship, namely along the axis perpendicular to the axis x. The handling orientation also encourages its stable and fairly compact storage on the drum of a winch of axis substantially parallel to the axis x.

The axis x is advantageously substantially perpendicular to the longitudinal axis of the surface ship. This allows the towed body to be stored secured against rolling and pitching.

The deflector 60 substantially exhibits a shape of an angular portion, created about the axis x, of a cylinder of axis x. In the nonlimiting embodiment of FIGS. 1 to 4, the deflector 60 is formed by a roller mounted with the ability to turn with respect to the carrier ship, about its axis of rotation x. This makes it possible to limit friction between the deflector 60 and the sonar device during launch and recovery operations. As a variant, the roller R is fixed relative to the surface ship B.

In the embodiment of FIGS. 1 to 4, the handling device comprises a set of adjacent cylindrical rollers R with longitudinal axes substantially parallel to one another and aligned along an axis which, in a calm sea state, is substantially horizontal and perpendicular to the axis x.

Figure 4:
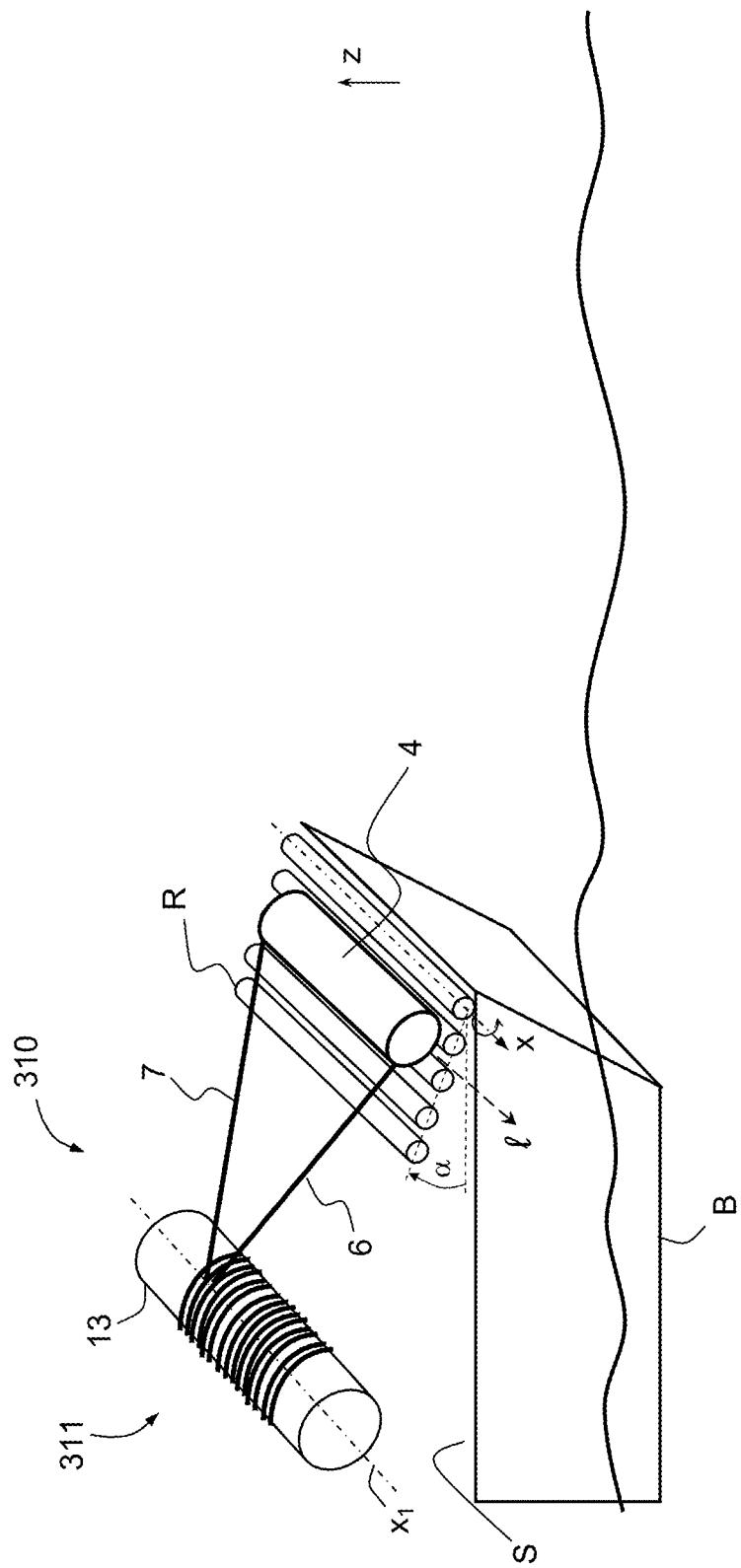

Advantageously, as visible in FIG. 4, the rollers R are configured and positioned in such a way that the towed body 4, oriented in such a way that the axis l is substantially parallel to the axis x, is able to rest on two rollers R which prevent the towed body 4 from moving along the axis along which the rollers R are aligned. Thus, the two adjacent rollers form a nest on which the towed body 4 can be stored.

Figure 6:
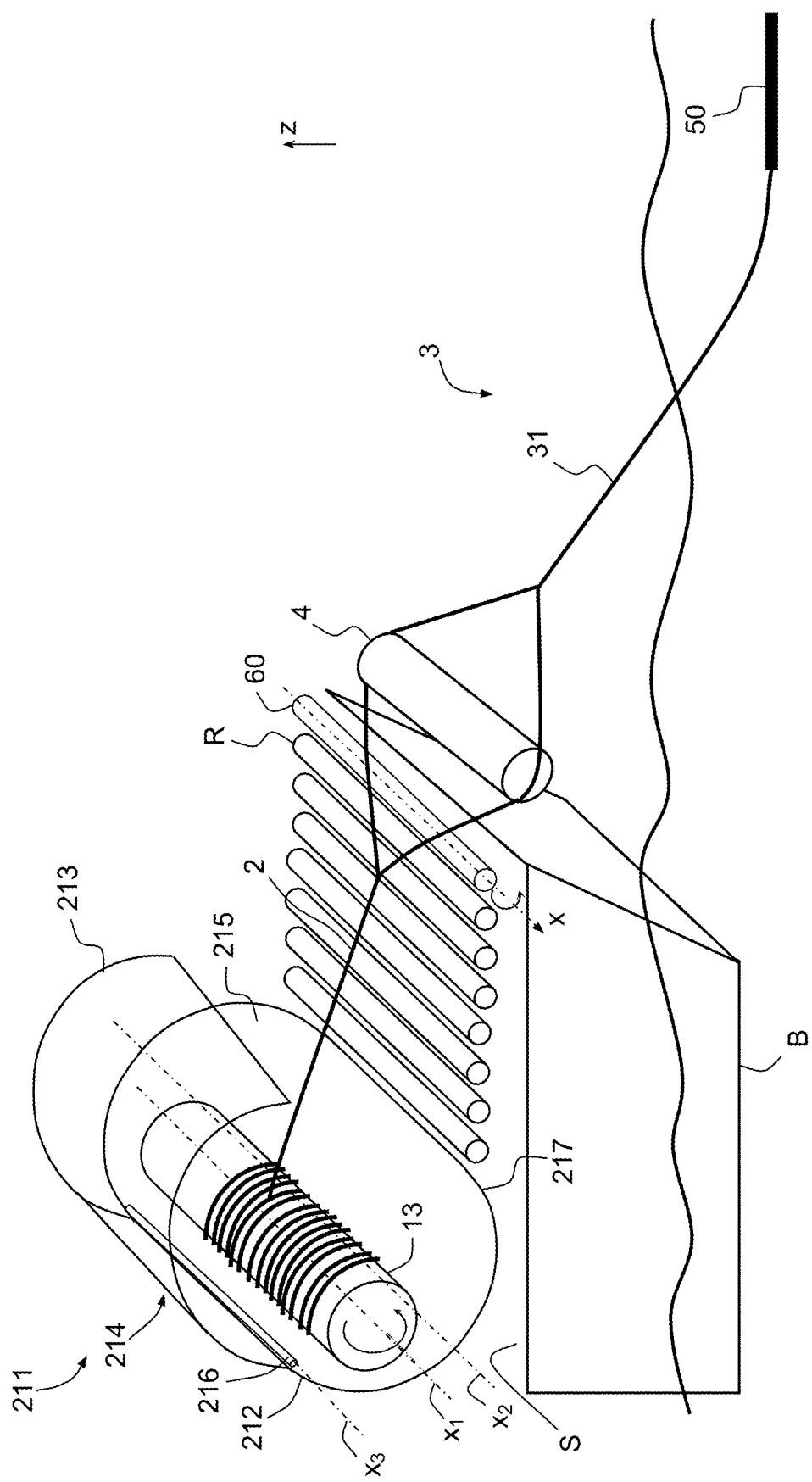
Figure 7:
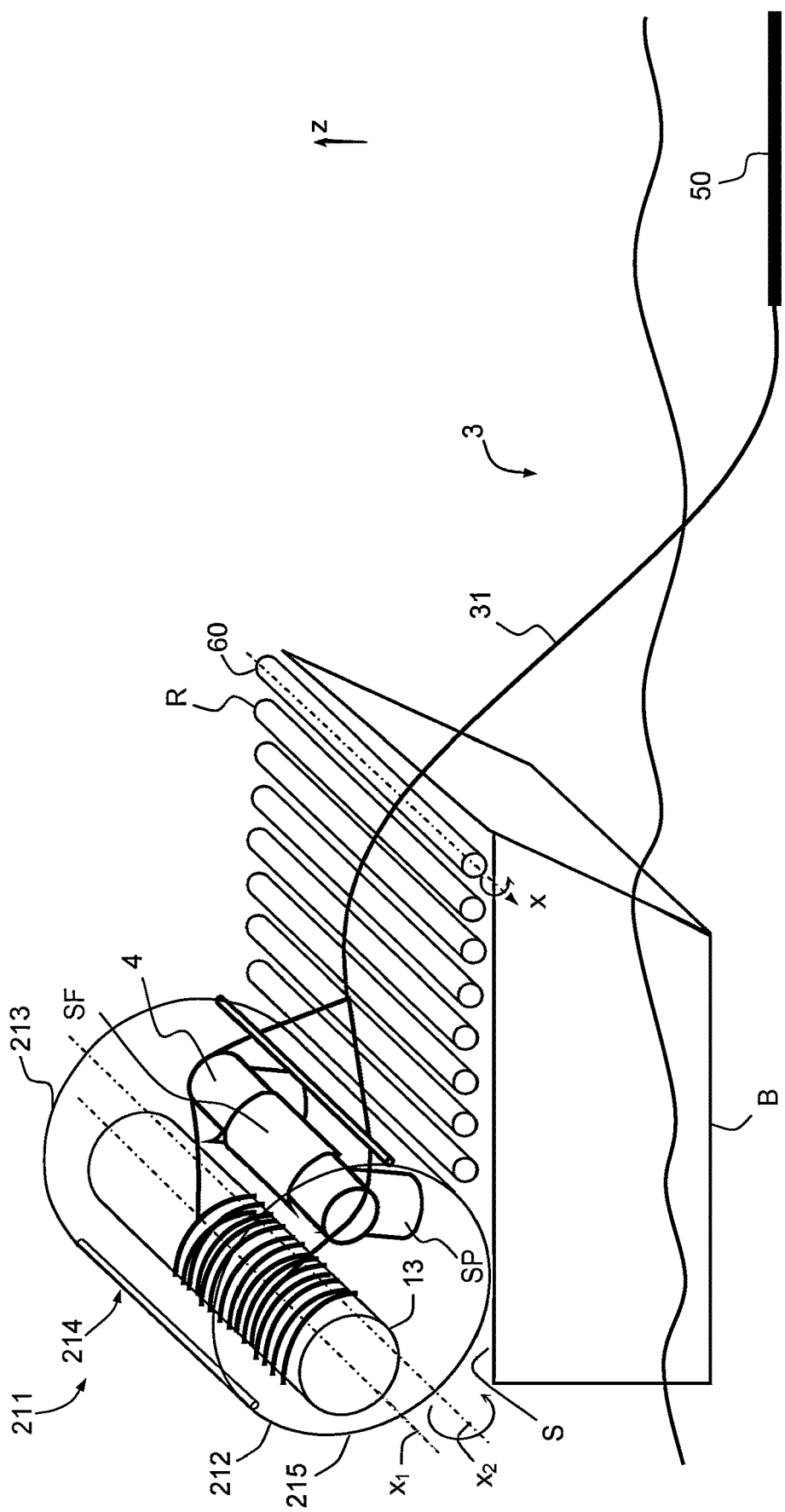

Advantageously, the axis along which the rollers R are aligned may be inclined with respect to the horizontal in a calm sea state, as visible in FIG. 4, or may be horizontal in a calm sea state, as depicted in FIGS. 5 to 7. Inclination encourages the towed body to be secured stably against pitching under the effect of the force of gravity and the traction of the hangers. Furthermore, inclination allows for easier relaunch.

Advantageously, the rollers R are dimensioned so that the towed body 4 resting on two adjacent rollers is in direct physical contact only with the two adjacent rollers R. That makes it possible to limit the risk of damage to the towed body 4.

In FIGS. 1 to 4, the axis x of the deflector 60 is substantially parallel to the first axis of rotation x1 of the first drum 13. As a variant, these axes could be non-parallel, for example in the event that a pulley were to deflect, in a horizontal plane, the axis of the tow cable 2 between the deflector 60 and the first drum.

In FIGS. 1 to 4, the hangers 6 and 7 are fixed to the longitudinal ends of the elongate body. In other words, the fixing points 44 and 45 are situated at, which means to say a zero distance from, the respective longitudinal ends 42 and 43 along the longitudinal axis l. This embodiment limits the risks of the ends of the elongate body becoming jammed during recovery of the body.

In a less advantageous variant, at least one of the two fixing points 44, 45 is situated at a distance, along the longitudinal axis l, from the longitudinal end near which it is situated.

Advantageously, the distance separating the first fixing point 44 from the first longitudinal end 42 along the axis l is substantially the same as the distance separating the second fixing point 45 from the second longitudinal end 43 along the axis l. That makes it possible to encourage a vertical orientation of the longitudinal emitting antenna during towing. As a variant, these two distances are different, but this is less advantageous for the stability of the towed body during towing.

In FIGS. 1 to 4, the length of the hangers 6 and 7 and the position of the deflector 60 are defined in such a way that the hangers 6 and 7 come to bear against the deflector, during the first winding step, when the towed body 4 is fully immersed or at least partially immersed, in a calm sea state, when the towing speed is below or equal to the maximum towing speed for recovery. This characteristic allows the towed body to be stabilized, namely makes it possible to begin to limit its freedom of movement, before it exits the water. This makes it possible to limit the movements of the elongate object as it exits the water, notably when the sea state is rough, compared with a situation in which the towed body 4 is emerged and suspended from the tow cable 2 while the tow cable 2 is still bearing on the deflector and deflected thereby. In the latter situation, an uncontrolled rotational movement of the longitudinal axis of the elongate body about the tow cable is brought about by a rough sea.

This is obtained through a suitable choice of the position of the deflector and of the length of the hangers according to the maximum towing speed.

As a variant, the length of the hangers 6 and 7 and the position of the deflector 60 are defined in such a way that the tow cable 2 bears against the deflector 60 and is deflected by the deflector 60 during the first winding step, when the towed body 4 is emerged and suspended from a portion of the tow cable 2 extending between the hangers and a region of the tow cable that is bearing against the deflector 60.

In the first embodiment of FIGS. 1 to 4, the towed body 4 is situated at the end of the sonar device 301. The sonar device 301 does not have a flexible towed body of the type incorporating a receiving antenna and intended to be towed by the tow cable 2 via the towed body 4.

In the embodiment of FIGS. 5 to 7, the sonar system differs from that of FIGS. 1 to 4 in that it comprises a sonar device 1 according to a second embodiment which differs from that of FIGS. 1 to 4 in that it comprises a flexible elongate body 3 incorporating a receiving antenna 50 and intended to be towed by the tow cable 2 via the towed body 4. The receiving antenna 50 comprises a plurality of electroacoustic transducers 41 distributed along the flexible elongate body 3.

The flexible elongate body 3 potentially comprises, as visible in FIGS. 6 to 7, an intermediate cable 31 of neutral buoyancy connecting the receiving antenna 50 of neutral buoyancy to the towed body 4 and/or a tail rope 32 of neutral buoyancy connected to the towed body 4 by the receiving antenna 50.

As visible in FIGS. 6 and 7, the flexible elongate body 3 advantageously has substantially neutral buoyancy so that it extends horizontally when immersed and towed by the surface ship B.

Advantageously, the flexible elongate body 3 is connected to the tow cable 2 via the towed body 4 which is itself connected to the flexible elongate body 3 in such a way that the flexible elongate body 3 applies traction to the towed body 4 at a third fixing point 46 situated near the first longitudinal end 42 of the towed body 4 and at a fourth fixing point 47 situated near the second longitudinal end 43 of the towed body 4. That allows better control over the orientation of the towed body when it is being recovered onboard the surface ship B.

The sonar device 1 comprises, for example, a third hanger 8 comprising a first end 8a attached to the towed body 4 at a third fixing point 46 (which is situated at the first longitudinal end 42, along the axis l, in the nonlimiting embodiment of FIG. 5) of the towed body 4 and a second end 8b connected to a first end 3a of the flexible elongate body 3 and a fourth hanger 9 comprising a first end 9a attached to the towed body 4 at a fourth fixing point 47 (which is situated at the second longitudinal end 43, along the axis l, in the nonlimiting embodiment of FIG. 5) of the towed body 4 and a second end 9b connected to the first end 3a of the flexible elongate body 3. The third fixing point and the fourth fixing point are securely attached to one another.

The variants concerning the positionings of the first fixing point and of the second fixing point and which were described with reference to FIGS. 1 to 4 also apply to the new fixing points of FIGS. 5 to 7. Likewise, the properties and arrangement of the first hanger and of the second hanger which were set out hereinabove, and the variants pertaining thereto, also apply to the third and fourth hanger.

In the figures, the ends 8b and 9b are fixed with respect to the end 3a of the flexible elongate element 3.

Advantageously, the third fixing point 46 for the first end 8a of the third hanger 8 is situated the same distance from the first longitudinal end 42 of the towed body 4 as the first fixing point 44 for the second end 6b of the first hanger 6, and the fourth fixing point 47 for the first end 9a of the fourth hanger 9 is situated the same distance from the second longitudinal end 43 of the towed body 4 as the second fixing point 45 for the second end 7b of the second hanger 7.

As a variant, these distances are not all equal.

The hangers 8 and 9 may have substantially the same length as the hangers 6 and 7 or a different length.

The hangers 8 and 9 are arranged in such a way as to form a V shape when taut. The V has a pointed bottom secured to the first end 3a of the flexible elongate body 3.

The way in which the towed body 4 behaves differs from that of FIGS. 1 to 4 in that during a first winding step, during which the first drum 13 is rotationally driven about the first axis x1 to wind the tow cable 2 onto the first drum 13, the traction applied by the flexible elongate element 3 to the towed body 4 via the third hanger 8 and the fourth hanger 9 limits the inclination of the towed body 4 with respect to the vertical plane containing the towing cable 2.

Even if the two hangers 6 and 7 are too short, as in FIG. 6, for the first hanger 6 to be bearing on the deflector 60 and deflected by the deflector while the towed body 4 is still immersed, then the toppling of the towed body 4 is limited by the traction applied by the flexible elongate body 3 to the towed body 4 as it exits the water. Thus, the orientation of the towed body is better controlled than in the embodiment of FIGS. 1 to 4. Furthermore, the traction applied by the elongate flexible element 3 to the towed body holds it away from the stern of the surface ship. The presence of the flexible elongate body 3 makes it possible to limit the risk of collisions with the surface ship.

In a variant, if the two hangers 6 and 7 are long enough, as in FIGS. 1 to 4, for the first hanger 6 to be bearing against the deflector 60 and deflected by the deflector while the towed body 4 is still immersed, then the traction applied by the flexible elongate body 3 to the towed body holds the towed body back and slows its toppling as it exits the water until such point as the two hangers come to bear against the deflector 60 and are deflected by the deflector 60. Thus, the orientation of the towed body is even between controlled.

In FIGS. 1 to 7, the towed body 4 is rigid so as not to be deformed during use, namely during the towing of the immersed sonar device, during recovery of the sonar device, and during the launching thereof.

Figure 10:
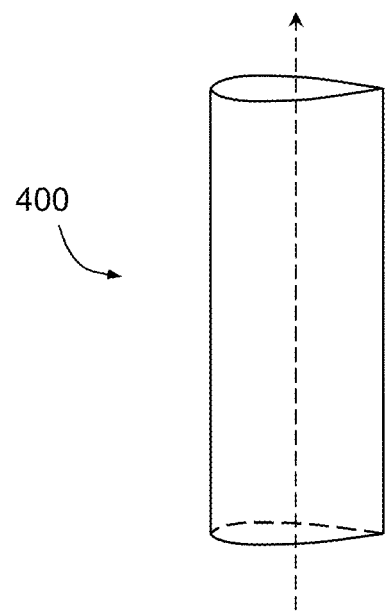

The towed body 4 may be cylindrical or the body may be hydrodynamically profiled. It may have roughly the shape of a teardrop in a plane substantially perpendicular to the axis 1, like the towed body 400 depicted in FIG. 10.

The towed body 4 may be equipped with a hydrodynamic covering exhibiting, nonlimitingly in FIG. 5, the form of a sail 5. This covering has not been depicted in FIGS. 6 to 7. The sail 5 is, for example, installed between the hangers 8 and 9 connecting the towed body 4 to the flexible elongate body 3. This sail limits the vibrations induced by vortex effect. Other types of hydrodynamic covering such as, for example, hairy jackets or inflatable sails may be provided.

In FIGS. 1 to 4, the winch 311 comprises only the first drum 13 able to store the sonar device 301 in FIGS. 1 to 4 by continuing the rotation of the first drum in the same sense of rotation until the towed body 4 comes to bear against the first drum 13. However, this winch 311 is not optimal for storing a sonar device 1 like that of FIGS. 5 to 7 of the type comprising a flexible elongate body 3 at the tail. Specifically, it is not optimal to wind up the flexible elongate body 3. It is an object of the invention to propose a sonar system for which the handling device allows this type of sonar device to be stored and which is compact and not excessively heavy. As a preference, although not necessarily, the handling device is configured to allow this device to be stored without the need to disconnect between the towed body and the flexible elongate body 3 and/or automatically.

Figure 8:
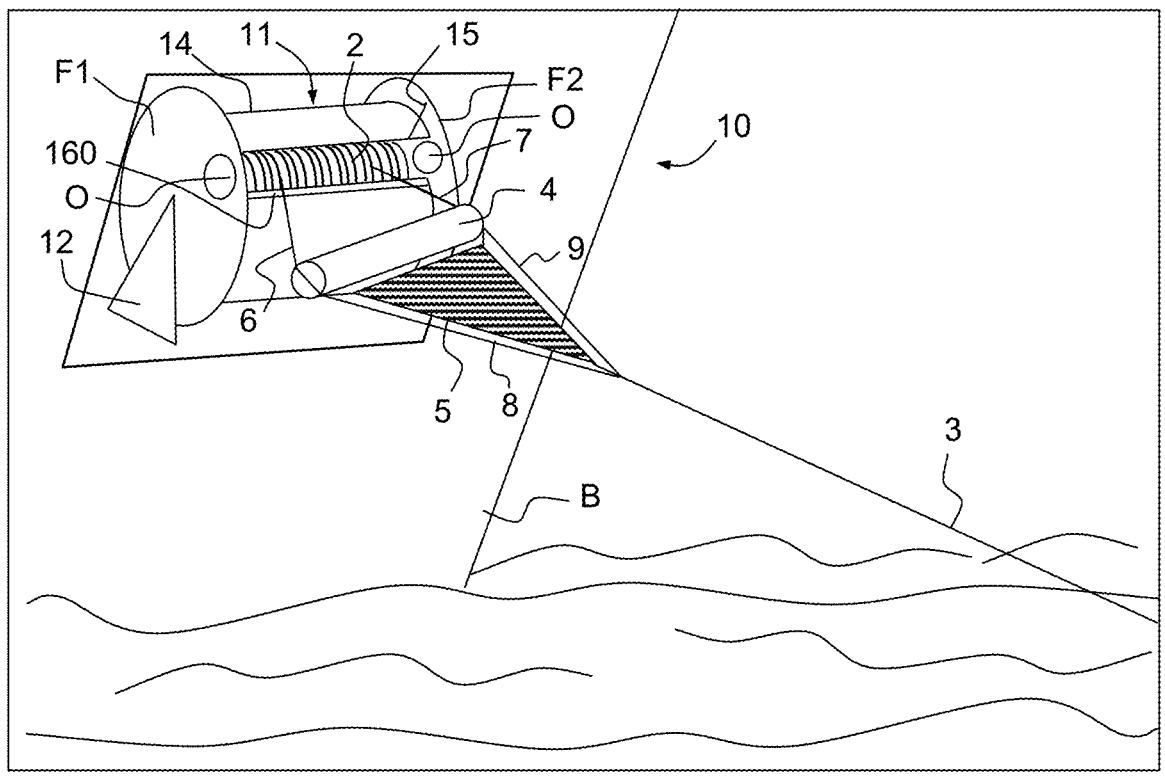
Figure 9:
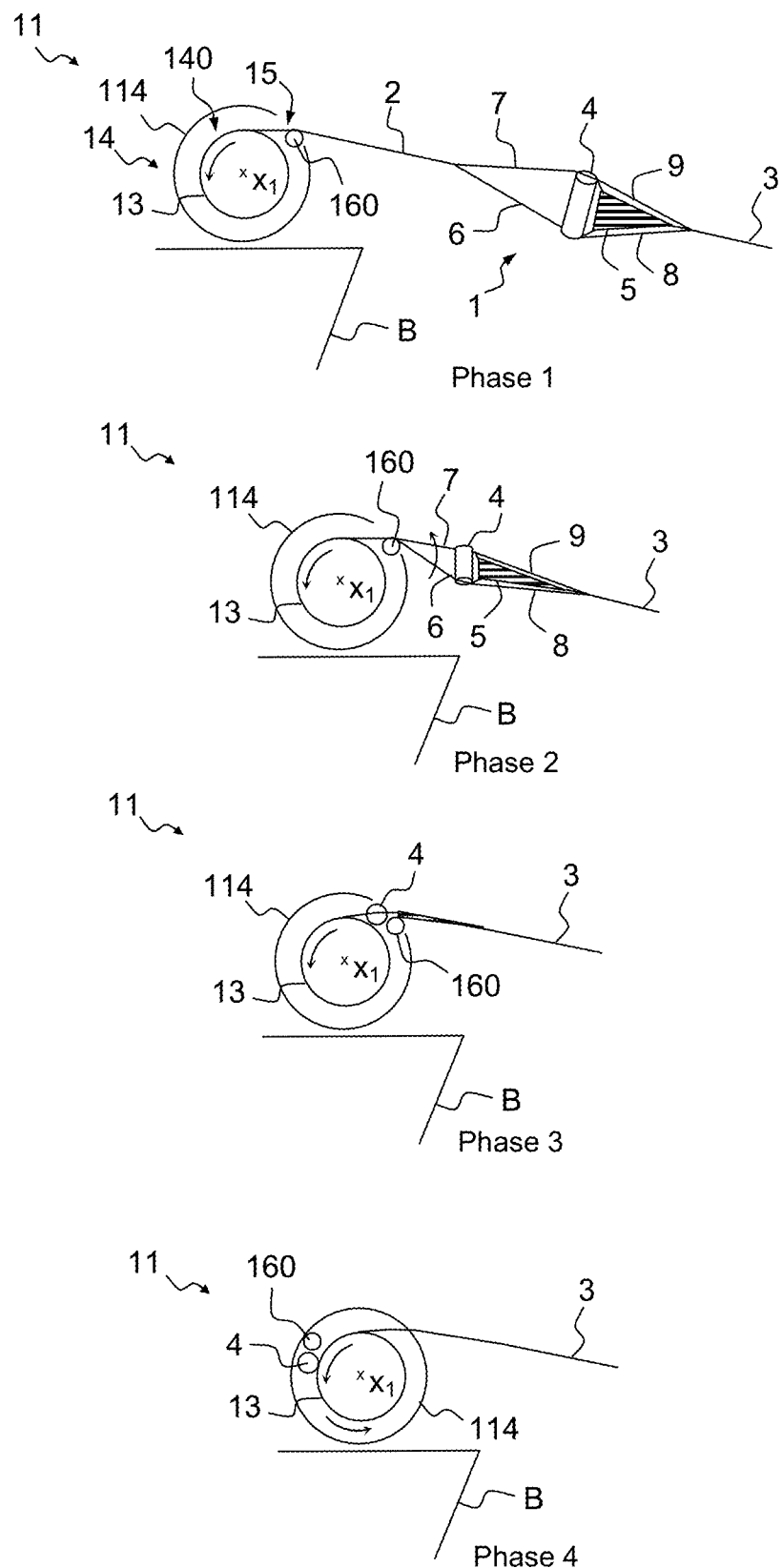

One example of an underwater system comprising a handling device 10 according to another embodiment of the invention is depicted schematically in perspective in FIG. 8 and in side view in FIG. 9 in successive phases 1 to 4 during the implementation of a method for storing (or recovering) the underwater device 1 by means of the handling device 10 in order to store the underwater device onboard the surface ship. It should be noted that FIG. 9 depicts a phase positioned between the phases 2 and 3 visible in FIG. 3.

The handling device 10 comprises a winch 11 comprising a frame 12 visible only in FIG. 8 for the sake of greater clarity. The frame 12 is intended to be fixed to a structure S of the surface ship B.

The winch 11 comprises a first drum 13 able to rotate with respect to the frame 12 about a first axis of rotation x1. This winch differs from that of FIGS. 1 to 4 in that it comprises a second drum 14 surrounding the first drum 13 and able to rotate with respect to the frame 12 about a second axis of rotation x2. The drums 13 and 14 are concentric in the nonlimiting embodiment of FIGS. 8 and 9 which means that the axis x2 is the axis x1.

The second drum 14, surrounding the first drum 13, has a greater diameter than the first drum 13.

The winch 11 is able to be in an uncoupled state in which the first drum 13 is able to be rotationally driven about the axis of rotation x1 with respect to the frame 12 and is uncoupled from the second drum 14 in terms of rotation about the first axis of rotation x1 and about the second axis of rotation x2.

This allows the tow cable 2 to be wound onto the first drum 13 during a first winding step during which the first drum 13 is rotationally driven about the first axis x1.

The second drum 14 is able, at least when the winch is in the uncoupled state, to be in an open state, as depicted in FIGS. 8 and 9 (phases 1 and 2) in which state the second drum 14 exhibits a receiving opening 15. The receiving opening 15 can have the towed body 4 passed through it to enter the volume 140 delimited by the drums 13 and 14. This volume surrounds the first drum 13 and is surrounded by the second drum 14.

The second drum 14 delimits a substantially cylindrical internal volume of which the diameter corresponds to the diameter of the second drum.

The winch 11 is able to be in a coupled state in which the first drum 13 and the second drum 14 are coupled in terms of rotation about the second axis of rotation x2.

As a preference, the drums 13 and 14 are secured to one another in terms of rotation about the second axis when the winch 11 is in the coupled state.

Thus, by driving the second drum 14 in rotation with respect to the frame 12, about the axis x2, when the winch 11 is in the coupled state, once the towed body 4 is stored in the volume 140, the flexible elongate body 3 winds onto the second drum 14.

Thus, the handling device 10 according to the invention allows the storage, in a limited volume and on a single winch 11, of a tow cable 2 and a linear emitting antenna active sonar 3, 6. The handling device according to the invention allows the tow cable 2 to be stored on the first drum 13, with the emitting linear antenna inside the volume delimited by the second drum and with the receiving linear antenna wound onto the second drum.

This handling device is less expensive, more compact, and less heavy than a device using separate winches, one to recover the tow cable and another to recover the flexible elongate body.

In general, this configuration is particularly advantageous for storing underwater devices according to the invention comprising an elongate towed body 4 intended to be stored without being deformed, such as the sonar device according to the invention.

Specifically, the form of a drum 14 allows the creation of a receiving opening 15 in the shape of a slot extending longitudinally along the axis x1 as depicted in FIGS. 8 and 9, and through which an elongate towed body 4 can pass with its longitudinal axis substantially parallel to the axis x1 during the first winding step without suffering deformation. The device thus allows the creation of towed bodies with linear emitting antenna that are relatively heavy and long and nondeformable.

Advantageously (although not necessarily), as visible in FIGS. 8 and 9, the receiving opening 15 extends substantially along the entire length of the second drum 14 along the first axis of rotation x1. As a variant, the receiving opening 15 extends over part of the length of the second drum 14 along the first axis of rotation x1.

Advantageously, the second drum 14 is able to be positioned, and preferably immobilized, in a receiving angular position, about the second axis x2, in which the receiving opening 15 is able to have the tow cable 2 and/or the towed body 4 passed through it preferably, although not necessarily, during the first winding step, as visible in FIGS. 8 and 9.

When the tow cable and the towed body 4 pass through the opening under the effect of the rotation of the first drum 13, the cable 2 and the towed body entering the volume 140 through the one same receiving opening 15, the storage of the underwater device requires no manual or automatic operation for disconnecting the towed body and the tow cable.

The receiving opening therefore has to be dimensioned so that the towed body can pass through it during the first winding step according to the orientation it adopts with respect to the opening. It notably needs to have a length that is greater, along the axis x1, than the length of the towed body 4 along the longitudinal axis l.

Advantageously, if the first winding step continues, the towed body 4 comes to bear against the first drum 13 under the effect of the rotational driving of the first drum about the axis x1.

The method for handling an underwater device can thus be easily automated, making it possible to avoid the intervention of a human operator and the associated risks, and allowing an underwater device to be stored onboard a USV.

As a variant, the step of inserting the towed body 4 into the volume 140 by passing through the receiving opening 15 may be performed subsequently to the first winding step, for example by a human operator or tooling.

Advantageously, the one same plane perpendicular to the axis x1 is situated equal distances from the two longitudinal ends of the first drum 13 and equal distances from the two longitudinal ends of the second drum 14.

Advantageously, the first drum 13 and the second drum 14 have the same length along the axis x1. The second drum 14 surrounds the first drum over the entire length of the first drum 13 along the axis x1. As a variant, the drums 13 and 14 are offset from one another along the axis x1.

As a variant, the second drum 14 is longer than the first drum 13 along the axis x1, which means that a greater length of flexible elongate body 3 can be wound on or, conversely, the second drum 14 is not as long as the first drum 13 along the axis x1, which means that a greater length of tow cable 2 can be wound on.

Advantageously, the towed body 4 is able to enter the volume 140 through the receiving opening 15 to be stored in the volume 140 without extending radially (with respect to the axis x2) beyond the volume 140. In other words, the towed body 4 is inside the cylinder, the diameter of which is the diameter of the second drum, formed about x2 over the entire length of this second drum along the axis x1. The winding of the flexible elongate body 3 onto the second drum 14 after the towed body 4 has been stored in the volume 140 is therefore not impeded by the towed body 4.

Advantageously, the towed body 4 is able to enter the volume 140 through the receiving opening 15 to be stored in the volume 140 without extending radially (with respect to the axis x2) beyond the volume 140 once the tow cable has been wound onto the first drum 13.

In FIGS. 7 and 9, the towed body 4 is able to be stored entirely inside the volume 140. As a variant, the towed body 4 could protrude beyond the volume 140 along the axis x2, for example when the first drum 13 is longer than the second drum 14.

The invention also relates to a method for recovering and launching the underwater device, which recovery and launch are able to be implemented by the handling device according to the invention. The handling device may be configured to implement these methods when a recovery or launch condition is met, for example, when a control device controlling the handling device receives a command to store or, respectively, to deploy.

The recovery method of the underwater device, initially deployed and connected to the drum 13 via the tow cable 2, comprises:
  a first winding step during which the winch 11 is in the uncoupled state, the first drum 13 being rotationally driven about the axis of rotation x1, with respect to the frame 12 so as to wind the tow cable 2 onto the first drum 13 (phases 1 and 2 of FIG. 9), the tow cable 2 passing through the receiving opening 15 or, in a less advantageous variant, through another opening formed in the second drum 14,
  a step of inserting the towed body 4 into the volume 140 (phase 3 of FIG. 9), through the receiving opening 15,
  a second winding step (phase 4 of FIG. 9) during which the winch 11 is in the coupled state, the second drum 14 being rotationally driven about the second axis of rotation x2 so that the flexible linear element 3 is wound onto the second drum 14.

In a first scenario, when the winch 11 is in the uncoupled state, the first drum 13 being rotationally driven about the axis of rotation x1, the tow cable 2 is wound onto the first drum 13 (phases 1 and 2 of FIG. 9) by passing through the receiving opening 15 and then the towed body 4 passes through the receiving opening 15, under the effect of the driving of the first drum 13 in rotation about the axis of rotation x1 (phase 3 of FIG. 9) to enter the volume 140 delimited by the second drum 14.

To this end, the second drum 14 is able to be positioned, and preferably immobilized, in what is referred to as a receiving angular position, about the axis x2, in which position the receiving opening 15 can have the tow cable 2 and the towed body 4 passed through it, during the first winding step. The receiving opening 15 therefore needs to be dimensioned such that the towed body can pass through it during the first winding step according to the orientation in which it arrives with respect to the opening.

Advantageously, if the first winding step continues, the towed body 4 comes to bear against the first drum 13, under the effect of the driving of the first drum 13 in rotation about the axis x1.

During the second winding step, the second drum 14 is rotationally driven about the axis x2 in the same sense of rotation as the sense of rotation of the first drum 13 during the first winding step.

The method for recovering the initially deployed underwater device is thus easy to automate, making it possible to avoid the intervention of a human operator and the associated risks, and allowing the underwater device to be stored onboard a USV.

In a second scenario, the towed body 4 does not enter the volume 140 through the receiving opening 15 under the effect of the rotation of the first drum 13 about the axis x1. The step of inserting the towed body 4 into the volume 140 by passing through the receiving opening 15 may be performed subsequently to the first winding step, for example by a human operator or tooling.

The method advantageously comprises the following steps:
  uncoupling the first drum 13 from the second drum 14 in terms of rotation about the axes x1 and x2 with respect to the frame 12 to place the winch 11 in the uncoupled state, this step being implemented by means for coupling/uncoupling the winch 11,
  immobilizing the second drum 14 in the open state, in terms of rotation with respect to the frame 12 about its axis of rotation x2, in the receiving angular position, this step being implemented by immobilizing means, such as, for example, a brake, an aligning pin or meshing gears.

The method also comprises, once the body has been inserted into the volume 140, a step of coupling the first drum 13 and the second drum 14 in terms of rotation about the second axis of rotation x2 with respect to the frame 12 so as to bring the winch 11 into the coupled state. This step is implemented by the coupling/uncoupling means.

In the embodiment of FIGS. 8 and 9, the drums 13 and 14 are concentric. This embodiment makes it possible to offer a handling device that is simple and lightweight. The two drums may, for example, be rotationally driven with respect to the frame, when the winch is in the uncoupled state and in the coupled state, by the one same shaft which is itself rotationally driven by the one same motor. The coupling/uncoupling means may be produced in a very simple way by mounting the first drum solid with the shaft, mounting the second drum in a pivoting connection on the first shaft and providing a coupler that allows the second drum to be rendered alternatively solid with the shaft and free to rotate with respect to the shaft about the axis of rotation x1.

The coupling/uncoupling means, just like the first coupling/uncoupling means that will be described later on, are, for example, means conventional to a person skilled in the art and produced, for example, in the form of a clutch or else based on a brake coupled to a jaw solid with one of the parts or else based on a motor coupled to a ring gear or else a connecting peg.

The handling device with concentric drums is particularly well suited to the storage of an underwater device 1 exhibiting a towed body 4, for example an emitting linear antenna, produced in the form of a cylindrical object of circular or noncircular cross section, for example of substantially teardrop-shaped cross section. The cylindrical towed body 4 may come to bear on a wound length of the tow cable 2, already wound onto the first drum 13, on each turn of a layer of this winding, thus encouraging the stability of the towed body 4 on the first drum 13.

When, during the first winding step, the cylindrical towed body comes to bear against the first drum 13 under the effect of the traction applied to the cylindrical towed body by the cable 2 or by an attachment system connecting the towed body to the cable, the traction applied by the cable or the attachment system keeps the body bearing against the first drum 13 without the need to provide fixing means for fixing the towed body 4 to the first drum 13. This traction is maintained during the second winding step. That avoids human intervention for performing this fixing or costly means for protecting the body against potential collisions that could be caused by destabilization of the body. Furthermore, this type of towed body can be stored in a compact volume formed around the drum 13.

In the embodiment depicted in FIGS. 5 to 7, the axis x1 is distant from the axis x2. This embodiment makes it possible to store, inside the volume delimited by the second drum 214, an object that has significant dimensions in the plane perpendicular to the axis x1 without the need to increase the diameter of the second drum 214 significantly and/or allows a body of complex shape to be stored.

The axes are, for example, separated along an axis which, in a calm sea state, is horizontal and perpendicular to the axis x1.

The first drum 13 is, for example, mounted with the ability to rotate about a shaft of axis x1 fixed to the second drum 214, for example to a shell 212 of the second drum 214. The shell 212 will be described later on.

The coupling/uncoupling means may comprise first coupling/uncoupling means allowing the first drum 13 to be permanently secured to and disconnected from the shaft on which it is mounted and means for immobilizing the second drum, about the axis x2 with respect to the frame 12, allowing the second drum to be alternately secured to and disconnected from the frame in terms of rotation about the axis x2. The uncoupled state is obtained by uncoupling the first drum 13 from the shaft about the axis x1 and by immobilizing the second drum 214 about the axis x2 with respect to the frame 12. The coupled state is obtained by coupling the first drum 13 to the shaft. A first motor is provided to allow the first drum 13 to be rotationally driven about the axis x1 with respect to the frame. A second motor is provided to allow the second drum 214 to be rotationally driven about the axis x2 with respect to the frame.

In the embodiment of FIGS. 8 and 9, the second drum 14, as visible in FIG. 9, has a shell 114 taking the form of a roughly cylindrical shell in which the receiving opening 15 is made.

The drum 14 of FIGS. 8 and 9 is able only to be in an open state. The second drum 14 is configured so that an elongate flexible element 3 can be wound onto the second drum 14 when the second drum 14 is in the open state.

Advantageously, the receiving opening 115 extends over an angle less than or equal to 20° and preferably less than or equal to 15° so as to allow the flexible elongate body 3 to be wound correctly onto the second drum 14.

As a variant, the winch 11 of FIGS. 8 and 9 could be capable of being alternately in the open state and in a closed state in which the receiving opening is at least partly closed as depicted in FIGS. 5 to 7. The flexible elongate element can then be wound on only in the closed state or in the closed state and in the open state.

In the embodiment of FIGS. 5 to 7, the handling device 210 differs from the handling device of FIGS. 8 and 9 notably in terms of the winch 211 which comprises a second drum 214 which differs from the second drum 14 of FIGS. 8 and 9 in that it is able to be alternately in an open state, as depicted in FIGS. 5 and 6, in which it exhibits a receiving opening 215 through which the towed body 4 can pass to enter the inside of the volume 240 delimited by the second drum 214 and the first drum 13 and surrounding the first drum 13, and in a closed state, as depicted in FIG. 7, in which the receiving opening 215 is at least partially closed. The same could also be true for coaxial drums, just like the more specific device and method features described hereinafter, considered alone or in combination. This type of configuration makes it possible to create a large receiving opening in the drum and thus receive, inside the volume delimited by the second drum 214, towed bodies of large size, for example in a plane perpendicular to the axis x2. Furthermore, a large opening leaves more space for potential manipulation of the towed body by a machine or by an operator.

The second drum 214 comprises a mobile cowl 213 able to move with respect to a first part 212 of the second drum 214 and able to adopt a first position (FIGS. 5 and 6) in which the cowl 213 opens the second drum 214 so that it comprises the receiving opening 215 and a second position (FIG. 7) in which the cowl 213 substantially closes the receiving opening 15 so that the second drum 214 exhibits a substantially cylindrical form. A residual slot advantageously allows a region of connection between the towed body and the flexible elongate body 3, or the flexible elongate body 3 itself, to pass.

In the nonlimiting example of FIGS. 5 to 7, the second drum 214 comprises a shell 212 having substantially the shape of an angular portion of a cylinder formed about the axis x2. The shell 212 extends angularly about the axis x2, from a first axial edge 216 substantially parallel to the axis x2 as far as a second axial edge 217 substantially parallel to the axis x2. The cowl 213 has a shape that substantially complements the shell 212 and is mounted with the ability to pivot with respect to the shell 212 about an axis of rotation of the cowl x3 parallel to the axis x2 near the edge 216 so that the cowl 213 is able to pass from the first position depicted in FIG. 5 to the second position depicted in FIG. 7 by a rotation with respect to the first part about the axis x3.

The storage (or recovery) method comprises a step of opening, which is implemented by opening means or by an operator, to cause the second drum to move from the closed state into the open state. This step of opening may be performed before the first winding step or else during or after the first winding step but before the insertion of the towed body. The method comprises, after the step of inserting the towed body and before the second winding step, a step of closing the second drum 214 to allow the elongate element 3 to be wound onto the second drum.

In the embodiment of FIGS. 5 to 7, the step of inserting the towed body 4 into the volume 140 through the receiving opening 15 is performed subsequently to the first winding step, for example, by a human operator or by tooling. As a variant, the step is performed, as in FIGS. 8 and 9, during the first winding step under the effect of the rotation of the first drum about the axis x1.

The handling device advantageously comprises fixing means SF, SP as depicted in FIG. 7, for fixing the towed body 4 to the second drum 214 and, more particularly, to the shell 212, and configured to secure the towed body to the second drum 14 in terms of rotation about the axis x2. These fixing means comprise, for example, a support SP intended to support the towed body 4 and fixed with respect to the shell 212 or with respect to the cowl, and fixing means SF for fixing the towed body 4 to the support SP. This type of means may also be provided when the drums are coaxial.

The second drum 214 able to be in the open state and closed state is configured, for example, as in FIGS. 5 and 6, so that the winding of a flexible elongate body, for example the body 3, onto the second drum 214 is impossible in the open state and is possible in the closed state.

As a variant, the second drum is configured so that the winding of a cable onto the second drum is possible in the open state and in the closed state. The cowl is, for example, of the rotary flap type having, for example, the shape of a portion of a cylinder of a diameter very slightly smaller than the diameter of the second drum and able to pivot about the axis x2 in order to close or to open the second drum.

As depicted in FIG. 8, the winch may comprise two endplates F1, F2 delimiting the drums along the axis x1. Advantageously, at least one endplate has an opening O allowing an operator to access the volume 140 so as to allow maintenance on the towed body 4 stored in the volume 140. This type of means may also be provided when the drums are coaxial.

In FIGS. 1 to 7, the handling device comprises a deflector 60 positioned upstream of the first drum 13 viewed from the towed body 4 with the first hanger 6 and the second hanger 7 initially immersed, during the first winding step. In other words, the hangers are able to come to bear on the deflector 60 before they start to be wound onto the first drum 13 during the first winding step.

More particularly, the deflector 60 is positioned near the stern PO of the surface ship B so that the towed body 4 adopts the handling orientation (x substantially parallel to l) before it arrives onboard the surface ship B. The deflector 60 is, for example, the first element of the handling device and/or of the surface ship that the hangers encounter during a method of recovering/storing the sonar device initially deployed and towed by the surface ship. This makes it possible to limit the risk of collisions between the towed body 4 and the stern of the ship. It also makes it possible to avoid designing large-sized openings into the stern of the carrier ship in order to allow the recovery of an emitting linear antenna and to avoid the creation of a recess in the main deck of the surface ship in order to be able to store an emitting linear antenna that is too tall to be housed between the main deck and the deck above.

The deflector 160 of the handling device of FIGS. 8 and 9 differs from that of FIGS. 1 to 7 in that it is closer to the first drum 13 and, more particularly, to the opening 15 so that the towed body passes through the opening 15 substantially in the handling orientation (l substantially parallel to the axis of the deflector 160 along which the deflector 160 extends longitudinally). That makes it possible to limit the risk of collisions between the towed body 4 and the second drum 14 as it passes through the receiving opening 15 and thus limits the risks of it becoming jammed as it arrives on the drum. It also, when the axis of the deflector is substantially parallel to the axis x1, allows the towed body 4 to be brought naturally, and without the intervention of tooling or of an operator, into an orientation favorable for passing through the receiving opening 15 and being stored easily and in a stable manner on the first drum 13 (axis l substantially parallel to the axis x1), it being possible for the towed body 4 to be kept bearing against the first drum 13 over its entire length. In the nonlimiting example of FIGS. 8 and 9, the deflector 160 is positioned upstream of the drum 13 and mounted on the second drum 14 so as to delimit the receiving opening 15.

More generally, a deflector 160 may be positioned in such a way that the towed body 4 passes through the opening 15 substantially in the handling orientation and/or comes into a position of bearing on the drum 13 substantially in the handling orientation.

This type of deflector 160 is positioned between the stern of the surface ship and the first drum 13, for example, between a deflector 60 and the first drum 13. This deflector 160 forms, for example, part of the winch being, for example, positioned upstream of the first drum 13, for example upstream of the receiving opening 15 (during the first winding step), or at the receiving opening 15.

Different deflectors occupying different positions described hereinabove may, as a variant, be provided in the one same handling device.

It should be noted that the first drum 13 also constitutes a deflector allowing the towed body 4 to be brought substantially into the handling orientation on the first drum 13. In a variant which has not been depicted, the handling device comprises a single deflector formed by the first drum 13.

The invention relates to a method for recovering the sonar device from a surface ship comprising a first winding step during which the first drum 13 is rotationally driven about the first axis x1 so that the tow cable 2 is wound onto the first drum 13, and so that the first hanger 6 and the second hanger 7 come to bear on the deflector 60 to be deflected by the deflector so that the longitudinal axis of the towed body 4 is oriented substantially parallel to the axis of the deflector x, when the towed body 4 is fully emerged and suspended from the first hanger 6 and from the second hanger 7. The invention relates to a sonar system configured for implementing this step during a recovery method which is, for example, implemented when a recovery condition is met. The sonar system then comprises control means for controlling the handling device to implement the method.

The invention relates to a method for launching the sonar device from a surface ship comprising a first pay-out step during which the first drum 13 is rotationally driven about the first axis x1 so that the tow cable 2 is unwound off the first drum 13 and so that the first hanger 6 and the second hanger 7 come to bear on the deflector 60 to be deflected by the deflector so that the longitudinal axis of the towed body 4 is oriented substantially parallel to the axis of the deflector x, when the towed body 4 is fully emerged and suspended from the first hanger 6 and from the second hanger 7. The invention relates to a sonar system configured for implementing this step during a launch method which is implemented for example when a launch condition is met. The sonar system then comprises a control device for controlling the handling device to implement the method.

In the examples depicted in the figure, the winch comprises a single second drum 14. In a more complex variant, the winch comprises a set of a plurality of second drums as defined hereinabove. These second drums have different diameters so as to surround one another. Each second drum 14 has an opening providing access to the volume situated between this second drum and the directly next drum of smaller diameter. That, for example, allows different towed bodies to be recovered into the volume delimited by each second drum and the drum of directly next smaller diameter, or allows portions of flexible elongate elements of different flexibilities to be wound onto drums of different diameters.

All the drums may be rotationally coupled and each drum may be rotationally uncoupled from the other drums.

In the examples depicted in FIGS. 1 to 9, the underwater device comprises a single towed body.

As a variant, the underwater device comprises a set of several towed bodies. The handling device may then comprise one or a plurality of second drums.

Each towed body is advantageously elongate along a longitudinal axis and have the same length, although this is not compulsory.

The underwater device, for example, comprises a set of a plurality of towed bodies 4. The towed bodies 4 are connected to one another, to the tow cable 2 and to the flexible elongate element 3 so as to be distributed along a curved towing line defined by the tow cable and the flexible elongate element when the underwater device is being towed by the surface ship, with all the towed bodies being distributed along the towing line.

Figure 11:
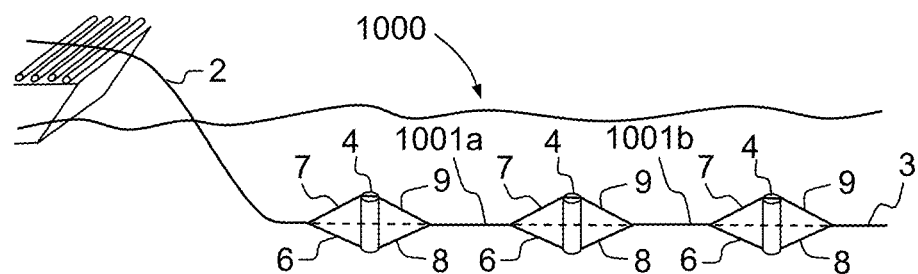

An example of this type of device is depicted in FIG. 11. The underwater device 1000 comprises a plurality of towed bodies 4 distributed along the towing line defined by the cable 2 and the flexible elongate body 3 and drawn in dotted line between the two. The towed bodies 4 are connected to one another by intermediate lines 1001a, 1001b.

The system is, for example, configured to store or to allow a plurality of towed bodies to bear on the first drum 13 or, more generally, between the first drum 13 and the second drum 14 or so as to store or allow the storage of different towed bodies in the successive volumes defined between the successive adjacent drums or bearing against successive drums.

In the example of FIG. 11, the towed bodies 4 are connected pairwise by intermediate lines 1001a, 1001b via hangers. Each intermediate body is fixed to a first and a second hanger 6, 7 connecting it to the tow cable and to a third and a fourth hanger 8, 9 connecting it to the flexible elongate body.

Figure 12:
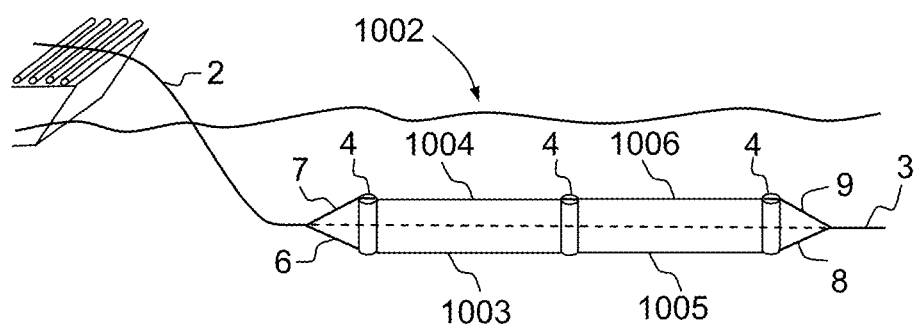

As a variant, in the underwater device 1002 of FIG. 12, the towed bodies 4 are connected pairwise by assemblies of intermediate lines 1003, 1004 and 1005, 1006. One of the towed bodies is fixed to a first and a second hanger 6, 7 connecting it to the cable. This towed body is connected to the adjacent towed body by several intermediate lines 1003, 1004 which are substantially parallel during towing. This towed body is itself connected to the adjacent last towed body by intermediate lines 1005,1006. The last towed body is fixed to a third and a fourth hanger 8, 9 connecting it to the flexible elongate body.

Each intermediate line is a flexible elongate element that may be produced in the form of a cable, for example an electric-mechanical cable. Each intermediate line may comprise at least one electroacoustic transducer. It may incorporate an acoustic antenna, for example an acoustic receiving antenna.

The control device for controlling the handling device (coupling/uncoupling means, first coupling/uncoupling means, drive means, immobilizing means, opening means) may comprise one or more dedicated electronic circuits or a general purpose circuit. Each electronic circuit may comprise a reprogrammable computing engine (a processor or a microprocessor for example) and/or a computer executing a program comprising a sequence of instructions and/or a dedicated computing engine (for example a set of logic gates such as an FPGA, a DSP or an ASIC, or any other hardware module).

The invention claimed is:

1. A sonar system comprising a sonar device intended to be towed by a surface ship and comprising a tow cable and a set of at least one towed device, comprising a towed body, intended to be towed by the surface ship via the tow cable, the towed body being elongate along a longitudinal axis from a first longitudinal end of the towed body as far as a second longitudinal end of the towed body, the towed body incorporating a first linear acoustic antenna comprising a plurality of electroacoustic transducers substantially aligned along the longitudinal axis, the towed device being configured and connected to the tow cable in such a way that the towed body is able, when it is being towed and is fully submerged, to exhibit an orientation wherein the longitudinal axis extends substantially along a vertical axis defined by the force of gravity, at least one towed body of the set of at least one towed device being connected to the tow cable by a first hanger and a second hanger of substantially the same length, a first end of the first hanger and a first end of the second hanger being connected to the tow cable and a second end of the first hanger being attached to the towed body at a fixing point of the towed body, which point is situated near the first longitudinal end, and a second end of the second hanger being attached to the towed body at a second fixing point secured to the first fixing point and situated near the second longitudinal end;

and a handling device intended for launching and recovering the sonar device from the surface ship, the handling device comprising a winch comprising a first drum able to rotate about a first axis of rotation to wind the tow cable onto the first drum; wherein the handling device comprises a set of at least one convex deflector having the overall shape of a portion of a cylinder extending longitudinally along an axis of the deflector, the deflector being arranged in such a way as to extend substantially horizontally, in a calm sea state, and substantially perpendicular to a vertical plane substantially parallel to an axis of the traction applied to the tow cable by the handling device during a first step of winding during which the first drum is rotationally driven about the first axis so that the tow cable is wound onto the first drum and so that the first hanger and the second hanger come to bear against the deflector so as to be deflected by the deflector so that the longitudinal axis of the towed body is oriented substantially parallel to the axis of the deflector when the towed body is fully emerged and suspended from the first hanger and from the second hanger.

2. The sonar system as claimed in claim 1, wherein the first hanger and the second hanger each have a fixed length.

3. The sonar system according to claim 1, wherein the second end of the first hanger is attached to the first longitudinal end of the towed body and the second end of the second hanger is attached to the second longitudinal end of the towed body.

4. The sonar system as claimed in claim 1, comprising a flexible elongate body of substantially neutral buoyancy intended to be towed by the tow cable and comprising a second acoustic antenna comprising a plurality of electroacoustic transducers distributed along the flexible elongate body, the flexible elongate body being connected to the tow cable via the set of at least one towed body, the towed body being connected to the flexible elongate body in such a way that the flexible elongate body applies traction to the towed body at a third fixing point situated near the first longitudinal end of the towed body and a fourth fixing point situated near the second longitudinal end of the towed body.

5. The sonar system as claimed in claim 4, wherein at least one towed body of the set of at least one towed body is connected to the flexible elongate towed body by a third hanger and a fourth hanger, a first end of the third hanger being attached to the towed body at a third fixing point situated near the first longitudinal end of the towed body and a first end of the fourth hanger being attached to the towed body at a fourth fixing point situated near the second longitudinal end of the towed body.

6. The sonar system as claimed in claim 5, wherein the set of at least one towed body comprises a single towed body or a plurality of towed bodies.

7. The sonar system as claimed in claim 6, wherein the set of at least one towed body comprises a plurality of towed bodies, the sonar device comprising at least one line joining together two towed bodies of the set and comprising at least one electroacoustic transducer.

8. The sonar system as claimed in claim 1, wherein the towed device is the towed body.

9. The sonar system as claimed in claim 1, wherein the axis of at least one deflector of the set is substantially parallel to the first axis of rotation.

10. The sonar system as claimed in claim 1, wherein at least one deflector of the set of at least one deflector is arranged in such a way that, during the first winding step, the first hanger and the second hanger are able to come to bear against the deflector, when the towed body is fully immersed.

11. The sonar system as claimed in claim 1, wherein the set of at least one deflector comprises at least one deflector arranged upstream of the first drum, viewed from the first hanger and from the second hanger initially immersed, during the first winding step.

12. The sonar system as claimed in claim 1, wherein the winch comprises a set of at least a second drum surrounding the first drum and able to rotate with respect to a frame of the winch about a second axis of rotation substantially parallel to the first axis of rotation, the winch being able to be in an uncoupled state wherein the first drum and the second drum are uncoupled in terms of rotation about the first axis of rotation and about the second axis of rotation, so as to allow the tow cable to be wound onto the first drum during the first winding step during which the first drum is rotationally driven about the first axis, the second drum being able to be in an open state wherein the second drum exhibits a receiving opening through which the towed body is able to pass during the first winding step in order to enter a volume surrounding the first drum and which is surrounded by the second drum, the winch being able to be in a coupled state wherein the first drum and the second drum are coupled in terms of rotation about the second axis of rotation so as to allow the flexible elongate body to be wound about the second axis of rotation during a second winding step during which the second drum is rotationally driven about the second axis.

13. The sonar system as claimed in claim 12, wherein the second drum is able to be in a receiving angular position, about the second axis with respect to the frame, wherein position the tow cable and the towed body pass through the receiving opening during the first winding step.

14. The sonar system as claimed in claim 1, wherein the handling device is configured to implement the following step during a method of recovering the initially immersed sonar device: the first winding step during which the first drum is rotationally driven about the first axis so that the tow cable is wound onto the first drum and so that the first hanger and the second hanger come to bear against the deflector to be deflected by the deflector so that the longitudinal axis of the towed body is oriented substantially parallel to the axis of the deflector, when the towed body is fully emerged and suspended from the first hanger and from the second hanger.

15. The sonar system as claimed in claim 14, wherein the second drum is able to be in a receiving angular position, about the second axis with respect to the frame, wherein in which position the tow cable and the towed body pass through the receiving opening during the first winding step, and wherein the handling device is configured to implement the first winding step until the towed body enters the volume delimited by the second drum through the receiving opening, and then a second winding step during which the second drum of the handling device, which is in the second state, is rotationally driven about the second axis of rotation so as to wind the flexible linear body onto the second drum.

* * * * *